US008510720B2

(12) United States Patent
Fischer

(10) Patent No.: US 8,510,720 B2
(45) Date of Patent: Aug. 13, 2013

(54) SYSTEM LANDSCAPE TRACE

(75) Inventor: Martin P. Fischer, Heidelberg (DE)

(73) Assignee: SAP AG, Walldorf (DE)

( * ) Notice: Subject to any disclaimer, the term of this patent is extended or adjusted under 35 U.S.C. 154(b) by 1199 days.

(21) Appl. No.: 11/961,778

(22) Filed: Dec. 20, 2007

(65) Prior Publication Data

US 2009/0164979 A1  Jun. 25, 2009

(51) Int. Cl.
*G06F 9/44* (2006.01)
(52) U.S. Cl.
USPC .......................................... 717/128
(58) Field of Classification Search
None
See application file for complete search history.

(56) References Cited

U.S. PATENT DOCUMENTS

| | | | |
|---|---|---|---|
| 7,194,664 B1 * | 3/2007 | Fung et al. | 714/45 |
| 7,222,142 B2 | 5/2007 | Fischer et al. | |
| 7,392,505 B2 * | 6/2008 | Ciapala et al. | 717/106 |
| 2004/0153457 A1 | 8/2004 | Fischer et al. | |
| 2004/0243773 A1 | 12/2004 | Fischer et al. | |
| 2005/0203952 A1 * | 9/2005 | Deily et al. | 707/104.1 |
| 2006/0101094 A1 | 5/2006 | Fischer et al. | |
| 2006/0129768 A1 | 6/2006 | Pferdekaemper et al. | |
| 2006/0149696 A1 | 7/2006 | Pferdekaemper et al. | |
| 2006/0149736 A1 | 7/2006 | Pferdekaemper et al. | |
| 2006/0155704 A1 | 7/2006 | Fischer et al. | |
| 2006/0242203 A1 | 10/2006 | Pferdekaemper et al. | |
| 2007/0143795 A1 | 6/2007 | Tran | |

OTHER PUBLICATIONS

Paul J. Leach, UUIDs and GUIDs, Feb. 4, 1998.*
SAP Performance Analysis [online] SAP, 2008 [retrieved on Apr. 9, 2008]. Retrieved from the Internet: <URL: http://help.sap.com/>. (43 pages).

* cited by examiner

*Primary Examiner* — Lewis A Bullock, Jr.
*Assistant Examiner* — Hau H Hoang
(74) *Attorney, Agent, or Firm* — Fish & Richardson P.C.

(57) ABSTRACT

This disclosure provides various implementations for supporting multiple system and application tracing. In one aspect, software can generate a globally unique identifier (GUID) for a first business process associated with a trace and transmit the GUID to a remote computer for association with a second business process related to the first business process. In another aspect, the software can identify a GUID for a trace that is executing for a first business process that is associated with a first application. The software can then associate the GUID with a second trace for a second business process related to the first business process, where the second business process is associated with a second heterogeneous application disparate from the first application. In some instances, the GUID may comprise a combination of a system identifier, a business process identifier, and a time identifier.

21 Claims, 15 Drawing Sheets

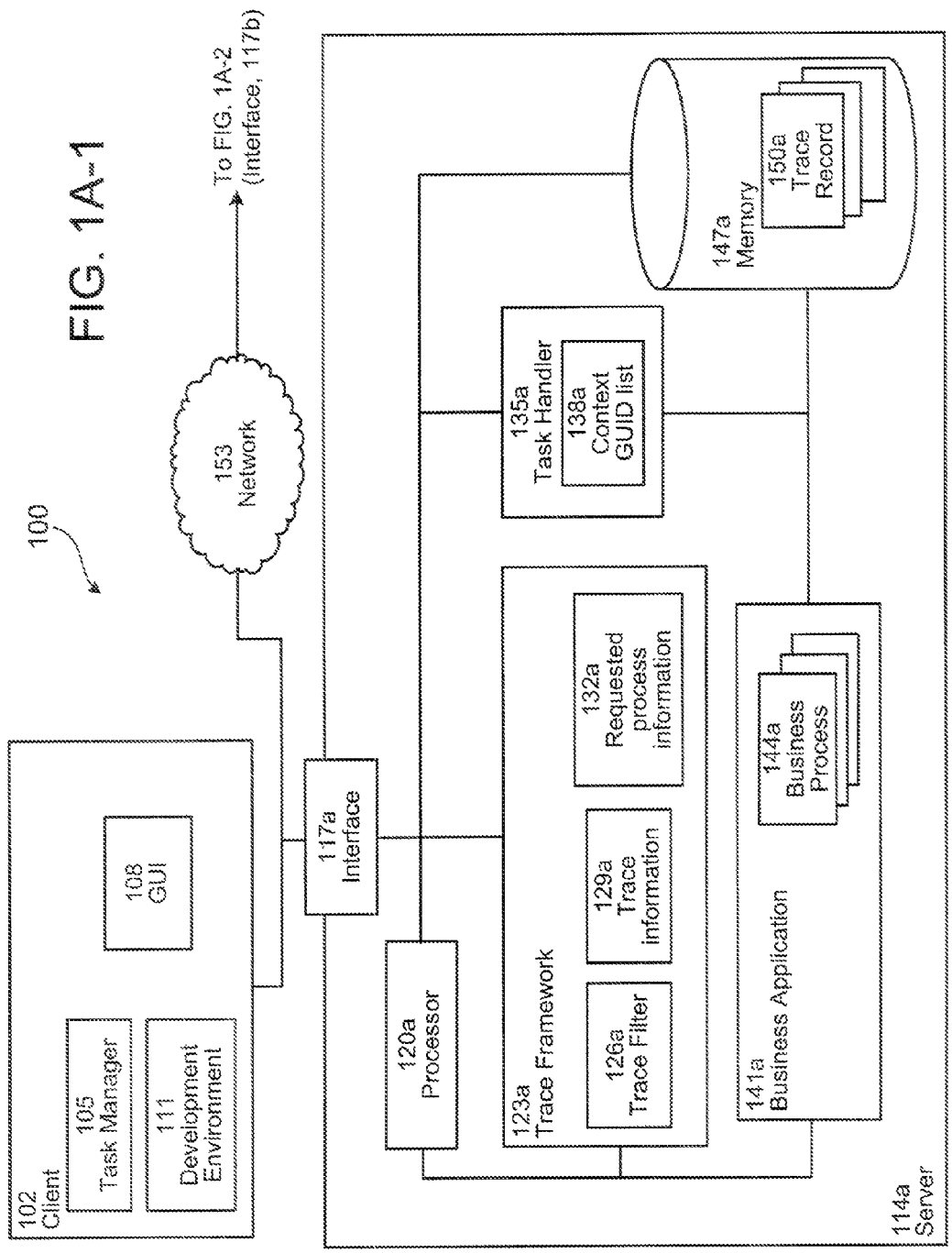

SYSTEM LANDSCAPE TRACE

TECHNICAL FIELD

This disclosure relates to methods and software for analyzing business processes and, more particularly, to methods and software for analyzing business processes distributed over logically and physically separated software systems.

BACKGROUND

Enterprise Resource Planning (ERP) systems integrate the data and processes of an organization into a unified system. A typical ERP system can use multiple components of computer software and hardware to achieve the integration. One general task in development and support of ERP systems, as well as other types of systems and software, is the analysis of various business processes running within the system. In some instances, this analysis may be performed by tracing the execution of one or more business processes. While tracing, a set of information (e.g., SQL statements, lock operations, communication steps, etc.) regarding the business process's execution is recorded for future review and analysis. The set of tracing information is typically used by programmers, system administrators, and advanced users for debugging and diagnosing problems with the traced systems and software. In some instances, the set of tracing information may also be used to determine which business processes could be optimized by removing or modifying the actions occurring during each business process's execution. Tracing may be used effectively both during development and after the release of various types of software.

In some modern ERP applications, business processes are distributed over a plurality of logically and physically separated software systems. Current ERP systems include tracing tools that allow business processes to be traced when executed on a local system. For distributed software systems, however, these tracing tools are not able to bridge system borders and provide complete trace records for related business processes executed remotely from the local system. In other words, if system tracing is desired in a distributed system, each system on which business processes are to be executed must be individually set and manually prepared for tracing prior to performing the trace analysis. Therefore, programmers and administrators must have detailed knowledge of each system related to a particular business process in order to collect the set of trace information necessary for a meaningful and complete analysis. Thus, automatic tracing of business processes distributed over several separated software systems is not possible using the current available trace tools.

SUMMARY

This disclosure provides various implementations of systems, software, and methods for supporting multiple system or application tracing. In one aspect, software can generate a globally unique identifier (GUID) for a first business process associated with a trace and transmit the GUID to a remote computer for association with a second business process related to the first business process. In another aspect, the software can identify a GUID for a trace that is executing for a first business process that is associated with a first application. The software can then associate the GUID with a second trace for a second business process related to the first business process, where the second business process is associated with a second heterogeneous application disparate from the first application. In some instances, the GUID may comprise a combination of a system identifier, a business process identifier, and a time identifier.

While generally described as software, some or all of these aspects may be further included in respective systems or other devices for executing, implementing, or otherwise analyzing a suitable system. The details of these and other aspects and embodiments of the present disclosure are set forth in the accompanying drawings and the description below. Other features, objects, and advantages of the preferred embodiment will be apparent from the description and drawings, and from the claims.

DETAILED DESCRIPTION

This disclosure generally describes implementing or facilitating the tracing and analysis of a plurality of business processes running in a distributed software environment. For example, a plurality of business processes are executed across servers or heterogeneous applications can be traced using a (multiple or distributed) trace framework for tracing, recording, and collecting information generated by the business processes 144 during their execution. Importantly, this solution allows a plurality of related business processes 144 performing interrelated tasks throughout the distributed software environment 100 to be easily traced and tracked, even when the plurality of business processes 144 are executed across two or more logically and/or physically heterogeneous software systems. In allowing the automatic tracing of a plurality of business processes 144 executed across distributed software systems, the present disclosure provides software developers and administrators the ability to perform complex system trace analysis and debugging without requiring extensive prior knowledge of what, when, where, and how the plurality of related business processes 144 execute.

Figures 1, 1A, 2:
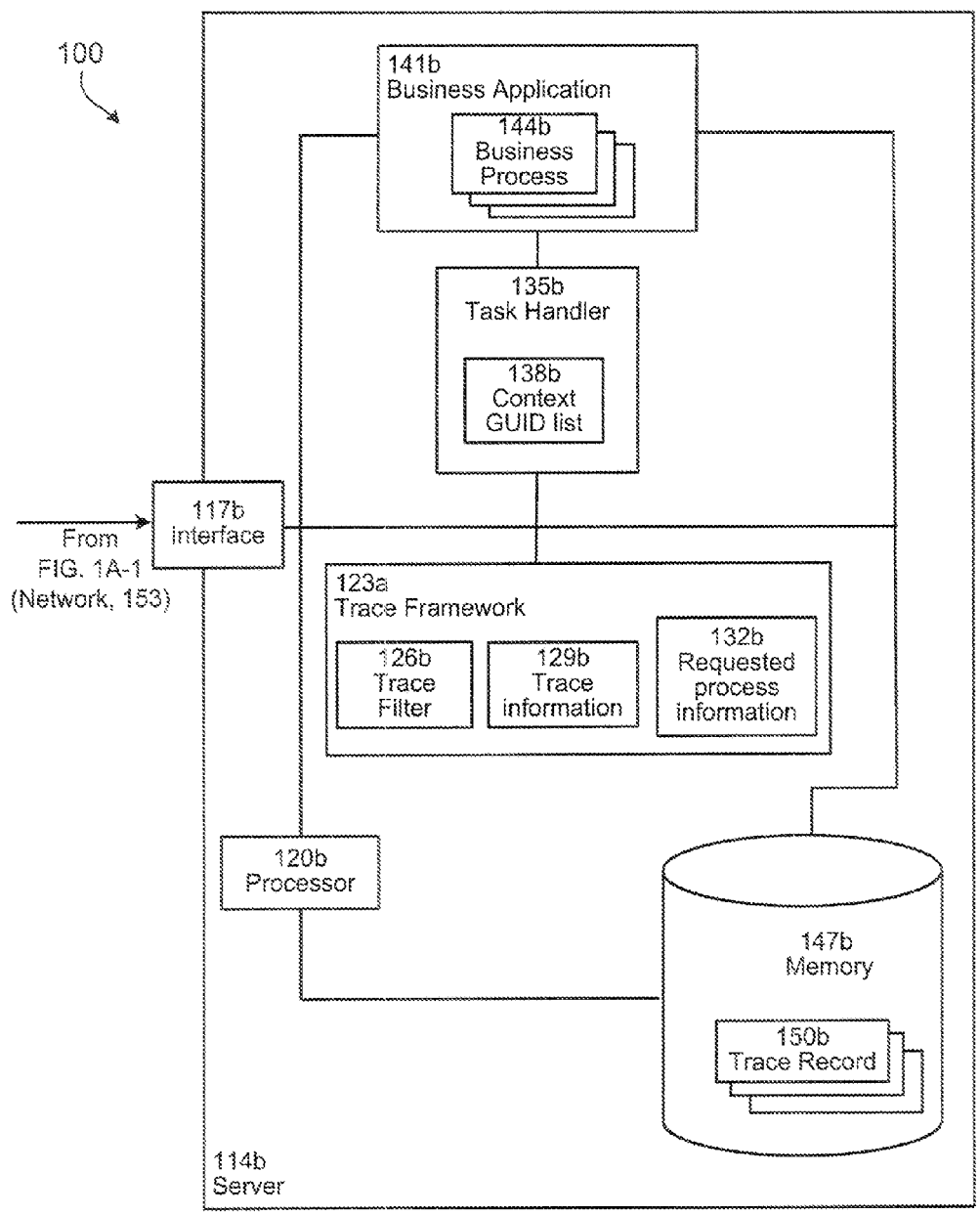
FIG. 1A illustrates a distributed software environment capable of analyzing one or more business processes according to a particular implementation of the present disclosure.
FIG. 2 illustrates a detailed view of an example task handler according to the illustrated environment of FIG. 1A.

Turning to the example implementation of FIG. 1A, environment 100 includes, or is communicably coupled with, one or more clients 102, a first server 114a, a second server 114b, and a network 153. In the present implementation, each server 114 includes an interface 117, a processor 120, a trace framework 123, a task handler 135, a business application 141, and a memory 147. Each server 114 comprises electronic computing devices operable to receive, transmit, process, store, or manage data associated with the environment 100. Generally, this disclosure provides merely one example of computers that may be used with the disclosure. As used in this document, the term "computer" is intended to encompass any suitable processing device. For example, the environment 100 may be implemented using computers other than servers, including a server pool. Further, either of or both servers 114a and 114b may be adapted to execute any operating system, including Linux, UNIX, Windows Server, or any other suitable operating system. According to one embodiment, either or both servers 114a and 114b may also include or be communicably coupled with a web server and/or a mail server.

The illustrated servers 114 each include an interface 117 for communicating with other computer systems in a client-server or other distributed environment, such as client 102 or the other servers 114 connected to the network 153. Generally, interface 117 comprises logic encoded in software and/or hardware in a suitable combination and operable to communicate with the network 153. More specifically, interface 117 may comprise software supporting one or more communication protocols associated with communications such that the network 153 or hardware is operable to communicate physical signals.

The network 153 facilitates wireless or wireline communications between server 114a and server 114b, as well as any other local or remote computer, such as client 102. Indeed, while illustrated as a single network, network 153 may be a discontinuous network without departing from the scope of this disclosure, so long as at least a portion of the network 153 may facilitate communications between senders and recipients. The network 153 may be all or a portion of an enterprise or secured network. In some instances, a portion of the network 153 may be a VPN merely between the server 114a and the client 102 across a wireline or wireless link. Such an example wireless link may be via 802.11a, 802.11b, 802.11g, 802.20, WiMax, or other types of wireless links. In other words, the network 153 encompasses any internal or external network, networks, sub-network, or combination thereof operable to facilitate communications between various computing components in the system. The network 153 may communicate, for example, Internet Protocol (IP) packets, Frame Relay frames, Asynchronous Transfer Mode (ATM) cells, voice, video, data, and other suitable information between network addresses. The network 153 may include one or more local area networks (LANs), radio access networks (RANs), metropolitan area networks (MANs), wide area networks (WANs), all or a portion of the Internet, and/or any other communication system or systems at one or more locations.

Each server 114 also includes a processor 120. Each processor 120 executes instructions and manipulates data to perform the operations of the associated server 114 such as, for example, a central processing unit (CPU), a blade, an application specific integrated circuit (ASIC), or a field-programmable gate array (FPGA). Although described as a single processor in the servers 114, multiple processors 120 may be used according to particular needs, and references to processor 120 are meant to include multiple processors where applicable. In this particular implementation, the processors 120 execute particular instances of the business application 141, the trace framework 123, and the task handler 135.

At a high level, business application 141 is any application, program, module, process, or other software that may execute, change, delete, generate, or otherwise manage business information according to the present disclosure. In certain cases, environment 100 may implement a composite business application 141. For example, portions of the composite application 141 may be implemented as Enterprise Java Beans (EJBs) or design-time components, and may have the ability to generate run-time implementations in different platforms, such as J2EE (Java 2 Platform, Enterprise Edition), ABAP (Advanced Business Application Programming) objects, or Microsoft's .NET. As illustrated in FIG. 1A, one or more portions of the business application 141 may be stored, referenced, or executed remotely (e.g., business application 141a shown in server 114a and business application 141b shown in server 114b). For example, a portion of business application 141 may be a web service that is remotely called, while another portion of business application 141 may be an interface object bundled for processing at client 102. Moreover, business application 141 may be a child or sub-module of another software module or enterprise application (not shown) without departing from the scope of this disclosure. Additionally, in some instances application 141 may be a hosted solution that allows multiple parties in different locations and associated with different systems to perform the respective processing. For example, client 102 or a user local to server 114b may access business application 141a on server 114a, or even as a hosted application located over network 153, without departing from the scope of this disclosure. In another example, portions of business application 141 may be used by an authorized user working directly at server 114a. Regardless of the particular implementation, "software" may include software, firmware, wired or programmed hardware, or any combination thereof as appropriate. Indeed, each software component may be fully or partially written or described in any appropriate computer language including C, C++, Java, Visual Basic, assembler, Perl, any suitable version of 4GL, as well as others.

More specifically, business application 141 may be a composite application, or an application built on other applications, that includes an object access layer (OAL) and a service layer. In this example, business application 141 may execute or provide a number of application services such as customer relationship management (CRM) systems, human resources management (HRM) systems, financial management (FM) systems, project management (PM) systems, knowledge management (KM) systems, and electronic file and mail systems. Such an OAL is operable to exchange data with a plurality of enterprise-based systems and to present the data to a composite application through a uniform interface. The example service layer is operable to provide services to the composite application. These layers may help business application 141 to orchestrate a business process 144 in synchronization with other existing processes (e.g., native process of enterprise-based systems) and leverage existing investments in the IT platform. As illustrated in FIG. 1A, business application 141 may run on a heterogeneous IT platform. In doing so, the business application 141 may be cross-functional in that it may drive business processes 144 across different applications, systems, technologies, and organizations. Accordingly, business application 141 may drive end-to-end business processes 144 across heterogeneous systems or subsystems.

Business application 141 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes the business application 141 as a composite application, the business application 141 may instead be a standalone or (relatively) simple software program. Regardless, business application 141 may also perform processing automatically, which may indicate that the appropriate processing is substantially performed by at least one component of environment 100. It should be understood that this disclosure further contemplates any suitable administrator or other user interaction with application 141 or other components of environment 100 without departing from its original scope.

As illustrated in FIG. 1A, each portion of the business application 141 (i.e., business application 141*a* and business application 141*b*) is associated with a plurality of business processes 144. In some instances, a first portion of the business application 141 (i.e., business application 141*a*) may be located at a first server 114*a* and associated with a first set of business processes 144*a*, while a second portion of the business application 141 (i.e., business application 141*b*) may be located at a second server 114*b* and associated with a second set of business processes 144*b*. When viewed as a whole, business applications 141*a* and 141*b* may represent the entire business application 141, while in other instances they may represent merely a portion of the distributed business application 141.

In the present disclosure, a business process 144 may be any process, task, method, service, or interface involved in the performance and operations of the business application 141. In some instances, each business process 144 may be a set of operations and logic related to a specific action or event. In some instances, a first business process 144*a* may be related to a second business process 144*b* such that the execution of the first business process 144*a* results in, includes, or causes a request for the second business process 144*b* to be executed. The first business process 144*a* and the second business processes 144*b* may be associated with two different portions of the business application 141, each portion (and therefore each process 144) executing remotely from the other. In those instances, the first business process 144*a*, during its execution, may send a request for the second business process 144*b* to be executed. The request may be sent using the first server's 114*a* inherent functionality to deliver the request across network 153 to the second business application 141*b*. In other instances, the requested second business process 144*b* may be associated with and local to the first portion of the business application 141*a*. In those instances, the business process 144*a* may use the internal communications of the business application 141*a* to request the execution of the local business process. Further, in some instances a portion of the first set of business processes 144*a* may overlap with a portion of the second set of business processes 144*b*, such that one or more business processes 144 may be performed by either the first or second portion of the business application 141. In other instances, however, the first set of business processes 144*a* may be mutually exclusive from the second set of business processes 144*b*, such that each business process 144 may be executed by only one portion of the business application 144. In those situations, each instance of a particular business process 144 must be performed by a particular portion of the business application.

The processor can also execute the trace framework 123, which generally provides tracing tools for the development and analysis of the business application 141 and related business processes 144. The disclosed trace framework 123 allows developers, administrators, and users to trace, record, and analyze the events that occur during the execution of a particular business process 144, including events that occur during the execution of another business process related to the execution of the particular business process 144. For example, one implementation of the trace framework 123 may allow tracing of one or more of the following events occurring during the execution of the business processes 144 associated with business application 141: database accesses, database locking activities, logical locking activities (e.g., SAP locks), remote calls of transactions and reports, http traffic, authorization checks, modularization units of the underlying programming language, and table buffer calls. In other implementations, other types of data and events may be traced. Records of the traced process events may be stored in a trace record 150. Each trace record 150 may contain information about a specific business process's 144 execution and may be implemented as eXtensible Markup Language (XML) documents, text files, flat files, comma-separated-value (CSV) files, or any other format compatible with the trace framework 123. In some instances, the trace record 150 may include event and tracing information for two or more related business processes 144. For instance, when a first business process 144*a* requests the execution of a second business process 144*b*, the tracing information for both processes 144 may be stored within the trace record 150*a* associated with the first business process 144*a*.

The trace framework 123 may create the trace records 150 upon activation of a particular trace. After creation and during execution of the one or more business processes 144, the trace records 150 may be updated asynchronously, such that the information is generated and stored as runtime files within the trace framework 123. At various intervals, or upon completion of the trace analysis, the trace record 150 may be updated and stored. In other instances, the trace records 150 may be synchronously updated during execution of the one or more business processes 144 using real-time updates to the trace record 150 in memory 147. The trace framework 123 may further include methods for collecting and retrieving generated trace records 150 from local and remote systems, as well as additional methods for analyzing, displaying, and exporting/importing the trace records 150.

In some instances, the trace framework 123a may be implemented as a portion of the business application 141a, while in others it may be an agent or module running on the server 114a capable of monitoring the business processes 144a being executed therein. In still other instances, the trace framework 123a may be a standalone application located in the server 114a that is separate from, yet tightly integrated with, the business application 141a. In those instances, the trace framework 123a may be an application similar to the business application 141 as described above. The trace framework 123 may also be distributed throughout the environment 100 such that portions of the trace framework 123 (e.g., trace framework 123a and 123b) are located at each server 114 or sub-system where relevant business processes 144 may be executed. Conversely, each server 114 may include a unique trace framework 123a and 123b, where each server's 114 respective trace framework 123 is capable of communicating with the trace frameworks 123 of other servers 114 via the network 153. Because each server 114 includes the trace framework 123 operable to perform the necessary tracing functions, related business processes 144 executed throughout the distributed system may be traced, regardless of where on the system they are actually executed.

The trace framework 123 also include a set of trace information 129 used to store trace records 150 collected after a trace analysis has completed and the various trace records 150 generated are retrieved. In some instances, the set of trace information 129 may instead be stored in the memory 147 associated with each traced business process 144. The set of trace information 129 may be stored as eXtensible Markup Language (XML) documents, text files, flat files, comma-separated-value (CSV) files, or any other format compatible with the trace framework 123. In some instances, the set of trace information 129 may be internally indexed or logically stored according to the associated context GUID.

As discussed above, the first business process 144a may request the execution of a local or remote second business process 144b. In either situation, information describing the requested second business process 144b and on which servers 114 or systems it resides may be maintained for retrieval of the related trace records 150 and information. To store that information, each trace framework 123 may include a set of requested process information 132. The set of requested process information 132 contains a set of information identifying and describing the business processes 144 requested by the first business process 144a. As previously described, the first business process 144a, in order to perform the task or function for which it is responsible, may require results, information, or other data obtainable after or during the execution of a second business process 144b. For instance, during its own execution the first business process 144a may generate a request for the execution of the second business process 144b. If the first business process 144a requests the execution of a second business process 144b that is local to first business application 141a, the set of requested process information 132 may include information describing the requested business process 144b, including in which portion of the first business application 141a the process is executed. If, on the other hand, the requested second business process 144b is to be executed at remote server 114b, additional information may be stored with the set of requested process information 132. For instance, information identifying the remote server 114b, the requested business process 144b, the communication protocols used to communicate with the remote server 114b, and the requesting business process 144a, along with other relevant information, may be stored with the set of requested process information 132. When the trace analysis is complete, the trace framework 123 may access the set of requested process information 132 to determine where trace information associated with the first business process 144a and its requested processes 144b may be stored, including where and how to collect the trace information.

A trace filter 126 may also be associated with each trace analysis performed by the trace framework 123. Trace filters 126 help define the set of business process event information to be recorded during the trace analysis. For instance, the user may need information regarding only the databases accessed by the first business process 144a. In those instances, the trace analysis will only generate and the trace records 150 will only store information related to the databases accessed by the business process 144. Other data and events may be specified by the user, including database locking activities, logical locking activities (e.g., SAP locks) remote calls of reports and transactions, Hypertext Transfer Protocol (HTTP) traffic, authorization checks, modularization units of the underlying programming language, and table buffer calls. Additionally, the trace filter 126 may limit the recording of events to those associated with one or more particular users, transactions, processes, or programs. As illustrated in FIG. 1A, the trace filter 126 may be stored in the trace framework 123. In other instances, however, the trace filter 126 may be stored in memory 147 and referenced by the trace framework 123 during the trace analysis.

Memory 147 may include any memory or database module and may take the form of volatile or non-volatile memory including, without limitation, magnetic media, optical media, random access memory (RAM), read-only memory (ROM), removable media, or any other suitable local or remote memory component. For example, memory 147 may store classes, frameworks, applications, backup data, business objects, jobs, or other information that includes any parameters, variables, algorithms, instructions, rules, constraints, or references thereto. The memory 147 may also include any other appropriate data, such as virtual private network (VPN) applications, firmware logs and policies, firewall policies, a security or access log, print or other reporting files, HTML files or templates, and others. In the present implementation, the trace records 150 generated by each trace analysis may be stored within the memory 147 associated with the local trace framework 123. For instance, trace records 150a generated by trace framework 123a may be stored within memory 147a associated with the first server 144a. Trace records 150b generated by the trace framework 123b of server 114b may be stored at memory 147b.

In many instances, the first business process 144a associated with business application 141a may request the execution of a second business process 144b associated with business application 141b, wherein the business application 141 is distributed across logically and/or physically separated systems, such as servers 114a and 114b of illustrated FIG. 1A. Current tracing methods cannot successfully and consistently traverse the divide between the two systems without prior knowledge of which systems the related business processes 144 will be running on. Further, even if some information regarding the systems is available, current tracing methods do not provide for the automatic tracing for related business processes 144 running on both the local and remote systems. In order to remedy this deficiency, the present disclosure introduces the task handler 135. In some instances, the task handler 135 may be a modified task manager, a program used to provide information about the processes and programs running on a system, including the information regarding the general status of that system. The task handler 135 may also be adapted to terminate processes and programs running on the server 114, as well as change the processes' priority. In one implementation, the task handler 135 may be the task manager associated with the operating system running at server 114. For instance, in servers running the Microsoft Windows XP operating system, the task handler 135 may be the Windows Task Manager. In other implementations, the task handler 135 may be a portion, module, or agent of either the trace framework 123 or the business application 141. Further, the task handler 135 may be a separate, standalone process or module operating within each server 114.

FIG. 2 provides a detailed view of the task handler 135. The task handler 135 includes a context globally unique identifier (GUID) generator 205, a plurality of application programming interfaces (APIs) 210, and a context GUID list 138. The context GUID generator 205 generates globally unique identifiers that are associated with each business process 144. In some instances, the task handler 135 may only generate a context GUID for business processes 144 after a trace analysis on the process is activated. In other instances, however, a context GUID may be generated for each business process 144 executed within the system, such that each business process 144, regardless of whether or not a trace analysis is activated, is associated with a context GUID. In various implementations, the GUID generator 205 may use different methods in generating the GUIDs. In one particular instance, each server 114 or system on which the business process 144 is executed may be identified by a unique identifier (e.g., a serial number or MAC address). The context GUID generator 205 may create the GUID for each business process 144 by combining additional information to the system's unique identifier, including one or more of the following: a system time stamp, a business process identifier, a business application identifier, a set of system entropy data, a randomly or pseudo-randomly generated number, or any other available or relevant information. Regardless of the information used to generate the context GUID, each generated GUID will be unique from every other context GUID within the distributed environment 100.

The context GUID list 138 stores a list of the generated context GUIDs and the business processes 144 associated with them. The context GUID list 138 may be used as a centralized storage for the information necessary to trace complex business processes 144 executing in a plurality of environments. The context GUID information stored in the context GUID list 138 includes the business process 144 traced and its associated GUID. FIG. 2 shows the context GUID list 138 stored within the task handler 135. In some instances, the context GUID list 138 may be stored in memory 147 and referenced by the task handler 135 when the information is needed. Further, in some instances each context GUID list 138 may only store the GUID information related to the business processes 144 executed on the system (or server 114) associated with the task handler 135. In other instances, one or more of the context GUID lists 138 may store the GUID for each and every business process 144 executed in the distributed environment 100. In those implementations, a centralized GUID list 138 may provide easier and quicker access to the GUID information for the trace framework 123 at which the trace analysis is requested.

In some implementations, the task handler 135*a* associated with trace framework 123*a* may be set in an inheriting mode. While in the inheriting mode, the task handler 135*a* can cause business processes 144 related to the first business process 144*a* to be associated with and inherit the GUID of the first business process 144*a*. For instance, when the first business process 144*a* requests the execution of a second business process 144*b*, the second task handler 135*b* may receive the context GUID associated with the first business process 144*a* from the first task hander 135*a*. The task handler 135*b* may then set the GUID associated with the second business process 144*b* to the GUID associated with the first business process 144*a* in the context GUID list 138*b*. The context GUID associated with the first business process 144*a*, along with the trace filter 126*a* associated with the trace analysis, may be communicated to the second task handler using the inherent functionality of the first server 114*a*, the second server 114*b*, and the network 153. By passing the context GUID to the remote task handler 135*b*, the second business process 144*b* may be associated with the same context GUID as the first business process 144*a*. Once the trace analysis is complete, the trace framework 123*a* may collect all local trace records 150*a* associated with the context GUID of the first business process 144*a*. The trace records 150 of each related business process 144, both local and remote, that inherited that context GUID may then be collected so that all trace information is available to the trace framework 123*a*, and therefore, the user.

Further, the task handler 135 may include a set of APIs 210 exposing the task handler's 135 functionality to other programs and developers in order to aid in the general performance of the environment 100. In some instances, the APIs 210 may be exposed to remote systems such that the remote systems may, using the exposed APIs 210, request the GUID associated with a particular business process 144. Using the APIs 210, the task handler 135 receiving the request may communicate the requested GUID to the remote system. The remote system may be able to access the functionality of the task handler 135 without additional knowledge regarding the business application 141 or trace framework 123 associated with the task handler 135.

In certain implementations, the network 153 may be a secure network associated with the enterprise and certain local or remote clients 102. The client 102 is any computing device operable to connect or communicate with servers 114 or the network 153 using a wireline or wireless connection. At a high level, each client 102 includes the GUI 108 and, in some cases, a task manager 105 and development environment 111. The client 102 comprises an electronic computing device operable to receive, transmit, process and store any appropriate data associated with the distributed environment of FIG. 1A. It will be understood that there may be any number of the clients 102 communicably coupled to the servers 114. For example, the client 102 may include one local client and two external clients to the illustrated portion of the network 153. Further, "client," "developer," and "user" may be used interchangeably as appropriate without departing from the scope of this disclosure. Moreover, each client 102 is described in terms of being used by one user. But this disclosure contemplates that many users may use one computer or that one user may use multiple computers. As used in this disclosure, the client 102 is intended to encompass a personal computer, touch screen terminal, workstation, network computer, kiosk, wireless data port, smart phone, personal data assistant (PDA), one or more processors within these or other devices, or any other suitable processing device. For example, the client 102 may comprise a computer that includes an input device, such as a keypad, touch screen, mouse, or other device that can accept information, and an output device that conveys information associated with the operation of the servers 114 or the clients 102, including digital data, visual information, or the GUI 108. Both the input device and output device may include fixed or removable storage media such as a magnetic computer disk, CD-ROM, or other suitable media to both receive input from and provide output to users of the clients through the display, namely the GUI 108. The client 102 may also include a task manager 105. The task manager 105 may be a program used to provide information about the processes and programs running on the client 102, including the information regarding the general status of the client 102. Further, the task manager 105 may be adapted to terminate processes and programs running on the client 102, as well as change the processes' priority. In other instances, the task manager 105 may have additional functionality similar to the task handler 135 described above.

GUI 108 comprises a graphical user interface operable to, for example, allow the developer to interact in a development environment 111, or to provide the client 102 an interface with at least a portion of environment 100 for any suitable purpose. Generally, the GUI 108 provides the user with an efficient and user-friendly presentation of data provided by or communicated within the system. The GUI 108 may comprise a plurality of customizable frames or views having interactive fields, pull-down lists, and buttons operated by the user. The GUI 108 is often configurable, supports a combination of tables and graphs (bar, line, pie, status dials, etc.), and is able to build real-time dashboards, where tabs are delineated by key characteristics (e.g., site). The GUI 108 is further operable to generate or request historical reports. Generally, historical reports provide critical information on what has happened including static or canned reports that require no input from the user and dynamic reports that quickly gather run-time information to generate the report. Therefore, the GUI 108 contemplates any graphical user interface, such as a generic web browser, touch screen, or command line interface (CLI) that processes information in environment 100 and efficiently presents the results to the user. The servers 114 can accept data from the client 102 via the web browser (e.g., Microsoft Internet Explorer or Mozilla Firefox) and return the appropriate HTML or XML responses using the network 153. The client 102 may also include, reference, or execute an agent to assist in data gathering. The agent may be any script, library, object, executable, service, daemon, or other process.

The client 102 may also include a development environment 111. In some instances, the development environment 111 may be used to develop (create, modify, or analyze) an application using modeling systems. In general, these models can specify the types of development objects or components that can be used to build applications, such as the business application 141, as well as the relationships that can be used to connect those components. The development environment 111 may be tightly integrated with the trace framework 123 such that additions and modifications to the application may be traced throughout development to analyze the various business processes 144 executed within the environment 100. The development environment 111 may be an integrated environment for the development of J2EE-based, multi-tiered business applications. It may provide an open and extensible development environment using Java and Web services. Tool sets may be represented as perspectives that control the editors and views displayed, thereby allowing developers to switch quickly between perspectives to work on different tasks. Some example perspectives may include:

J2EE perspective: Can support the development and deployment of J2EE technologies such as Java Server Pages (JSPs), servlets, and EJBs;

Web services perspective: Can combine tools to define, discover, and test Web services;

Persistence perspective: Can support the creation and definition of database objects, such as tables and indexes, through the use of the Java Dictionary, editors, and standards such as SQLJ or Java Data Objects;

Debugging perspective: Can support testing of Java applications by checking metrics, conventions, authorizations, and language restrictions; and/or Java Development Infrastructure perspective: Can provide tools for organizing, tracking, and synchronizing the work of large groups of developers. The developer infrastructure manages source code, incrementally builds new versions, and deploys applications on the right server at the right time.

The development environment 111 may also support development kits that contain special tools dedicated to certain components. For example, a Mobile Development Kit may integrate tools required to help build and test mobile applications for PDAs and laptops. The development environment 111 may also include tools dedicated to constructing an application's user interface. Some kits may be language-agnostic and may support Java, ABAP, as well as other programming languages.

In another example, the development environment 111 may be the technical foundation for enterprise mobility within another development studio and provide the technology that powers composite applications for a mobile business. With this development environment 111, the business may mobilize quickly, taking advantage of existing IT infrastructure and extending tried-and-true business processes within and beyond enterprise boundaries. This example development environment 111 may comprise three mobile client technologies to enable standardized mobile business solutions as well as customer-specific developments. These clients may be optimized for specific user roles and target devices. For example, the modules may include:

Mobile Java client: Can be optimized for personal digital assisted (PDA) or handheld devices that display occasionally connected applications, such as mobile asset management;

Mobile .NET client: Can be designed for Microsoft Windows-based devices that display occasionally connected CRM field applications with a rich function set; and/or Mobile browser client: Can be designed for mobile devices that are connected to a web server using various technology.

As an integrated component of another development studio, the development environment 111 may potentially leverage the overall platform benefits. For example, mobile business may operate in both connected and disconnected modes because development environment 111 may provide a local run-time environment, employees can perform their jobs whether disconnected or connected to the systems at their main office. With solutions powered by this development environment 111, employees may store data offline on their mobile device and then synchronize information on back-end systems as needed. This development environment 111 may provide a mobile development kit that helps developers build and customize mobile solutions that are tightly integrated with the back-end system. As described above, the development environment 111 is often used for customizing or enhancing business application 141 or a related framework.

Figures 1, 1B:
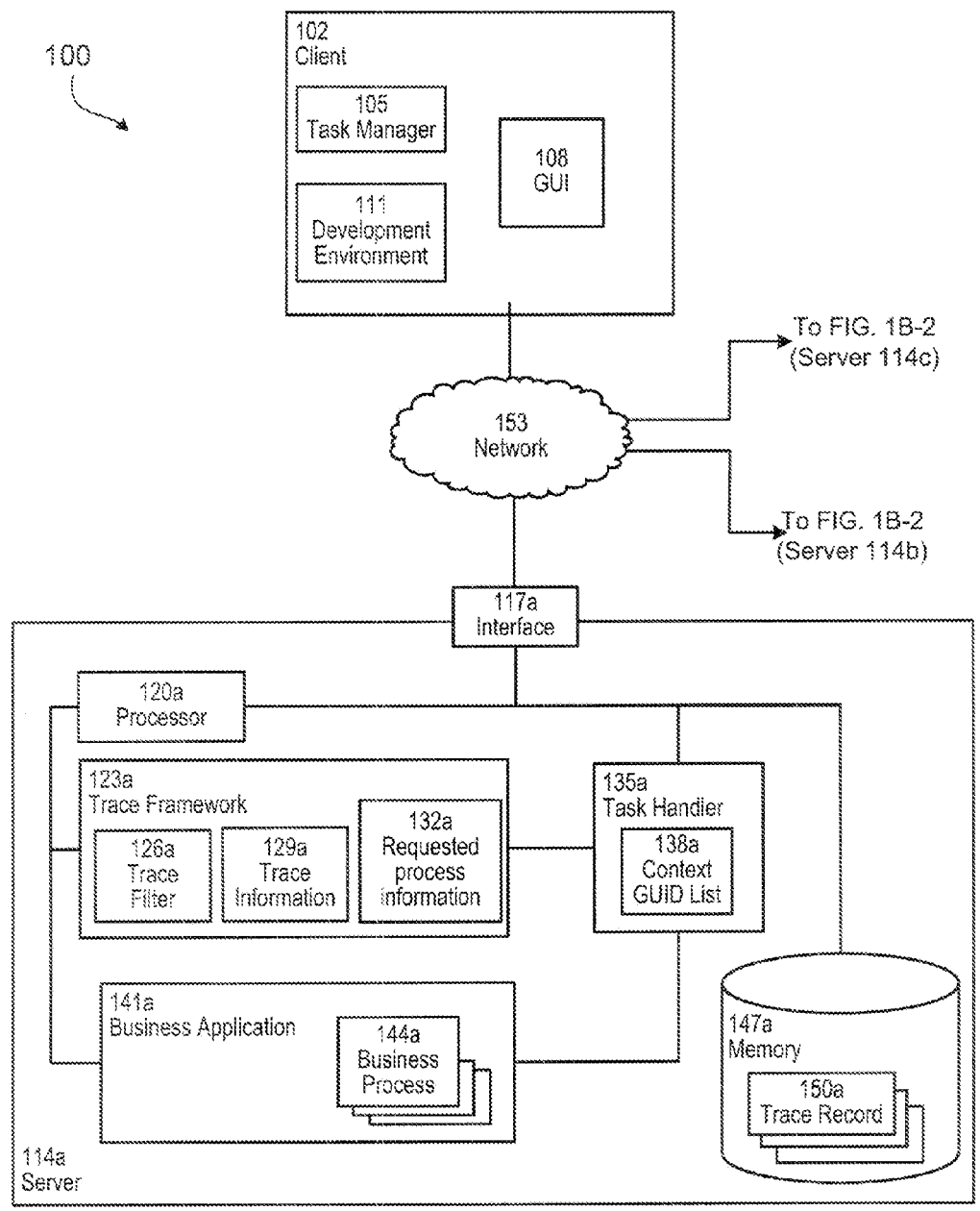
FIG. 1B illustrates an alternative implementation of a distributed software environment capable of analyzing one or more business processes according to another implementation of the present disclosure.
Figures 1, 1B, 2:
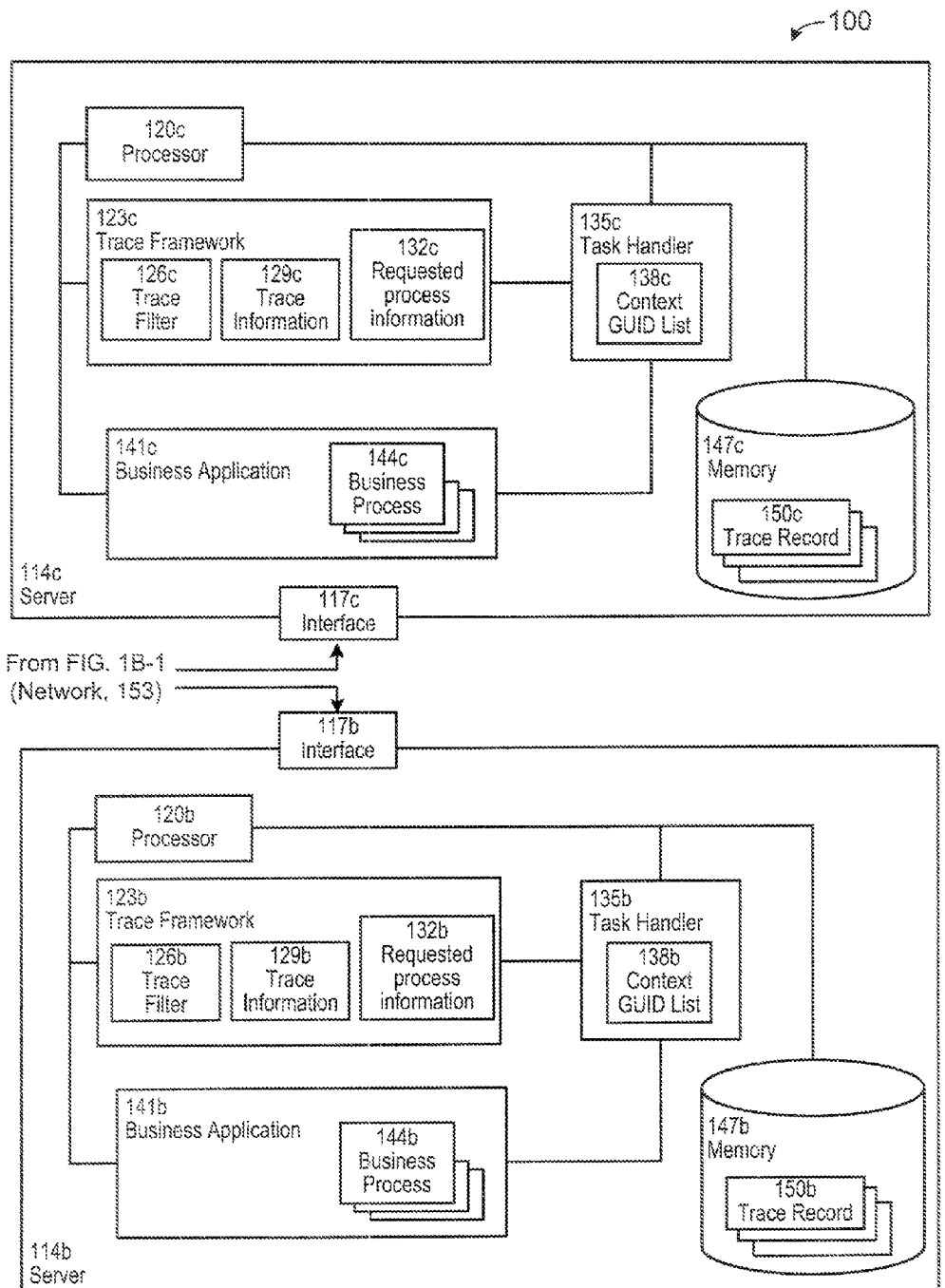
Figure 2:
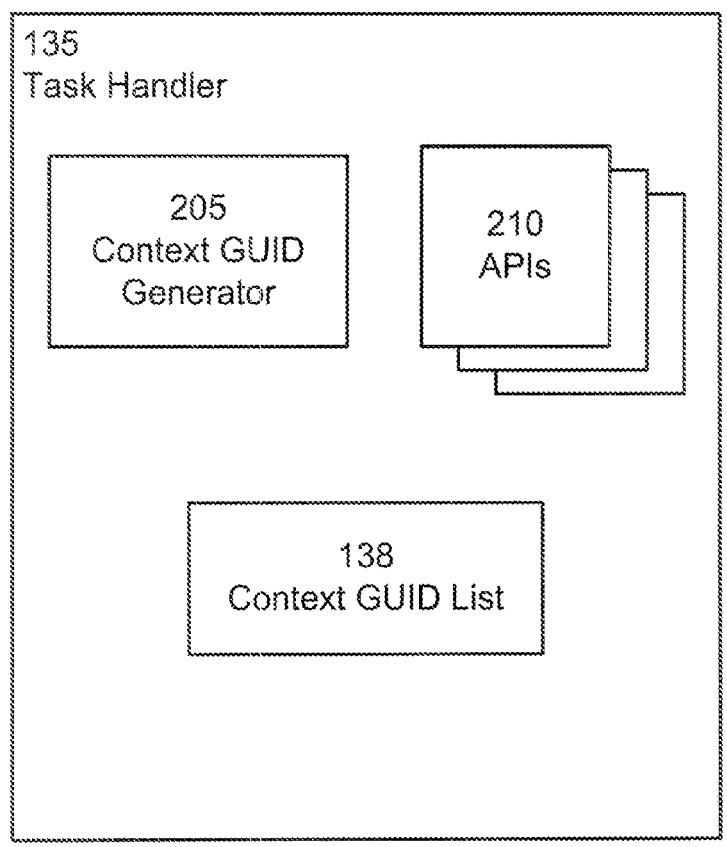

In alternative implementations (as shown in FIG. 1B), more than two servers 114 may be present. For instance, FIG. 1B illustrates a third server 114c, with a third portion of the business application 141c and an associated set of business processes 144c. Similar to the implementation of FIG. 1A, the illustrated environment 100 of FIG. 1B involves a distributed software environment, wherein the business application 141 is further distributed across the additional server 114c. Of note, the first business process 144a may request, for several reasons, that a second business process 144b be executed. When the request is sent to the second server 114b from the first business process 144a, along with the context GUID associated with the first business process 144a and the trace filter 126a, the trace framework 123a of the first server 114a may store the information regarding the execution request in the set of requested process information 132a. The request, along with the context GUID and the trace filter 126a, may then be received at the second server 114b, where the second business application 141b may execute the second business process 144b. The task handler 135b may then associate the context GUID of the first business process 144a with the second business process 144b such that the second business process 144b inherits the context GUID of the first business process 144a. Additionally, the trace filter 126a of the first trace framework 123a may be set as the trace filter 126b for the second trace framework 123b.

Similar to the first business process 144a, the second business process 144b may, during its own execution, request the execution of the third business process 144c associated with the third portion of the business application 141c. When that request is made, the information associated with the request to the third server 114c may be stored within the second trace framework's 123b set of requested process information 132b. Along with the request, the context GUID associated with the second business process 144b (and therefore, the first business process 144a) and the trace filter 126b may be passed to the third server 114c. The task handler 135c of the third server 114c allows the third business process 144c to inherit the context GUID of the related first and second business processes 144a and 144b. Further, the third portion of the trace framework 123c sets the received trace filter 126b as the new trace filter 126c. Additional iterations of the same process may be performed if additional servers 114 are associated with the network 153 and additional related business processes 144 are requested and executed in the distributed environment 100. Therefore, each business process 144 related to the first business process 144a, either directly or indirectly, may be associated with the same context GUID and trace filter 126a of the first business process 144a such that each trace record 150 associated with the first business process 144a is associated with a single context GUID.

Figure 3A:
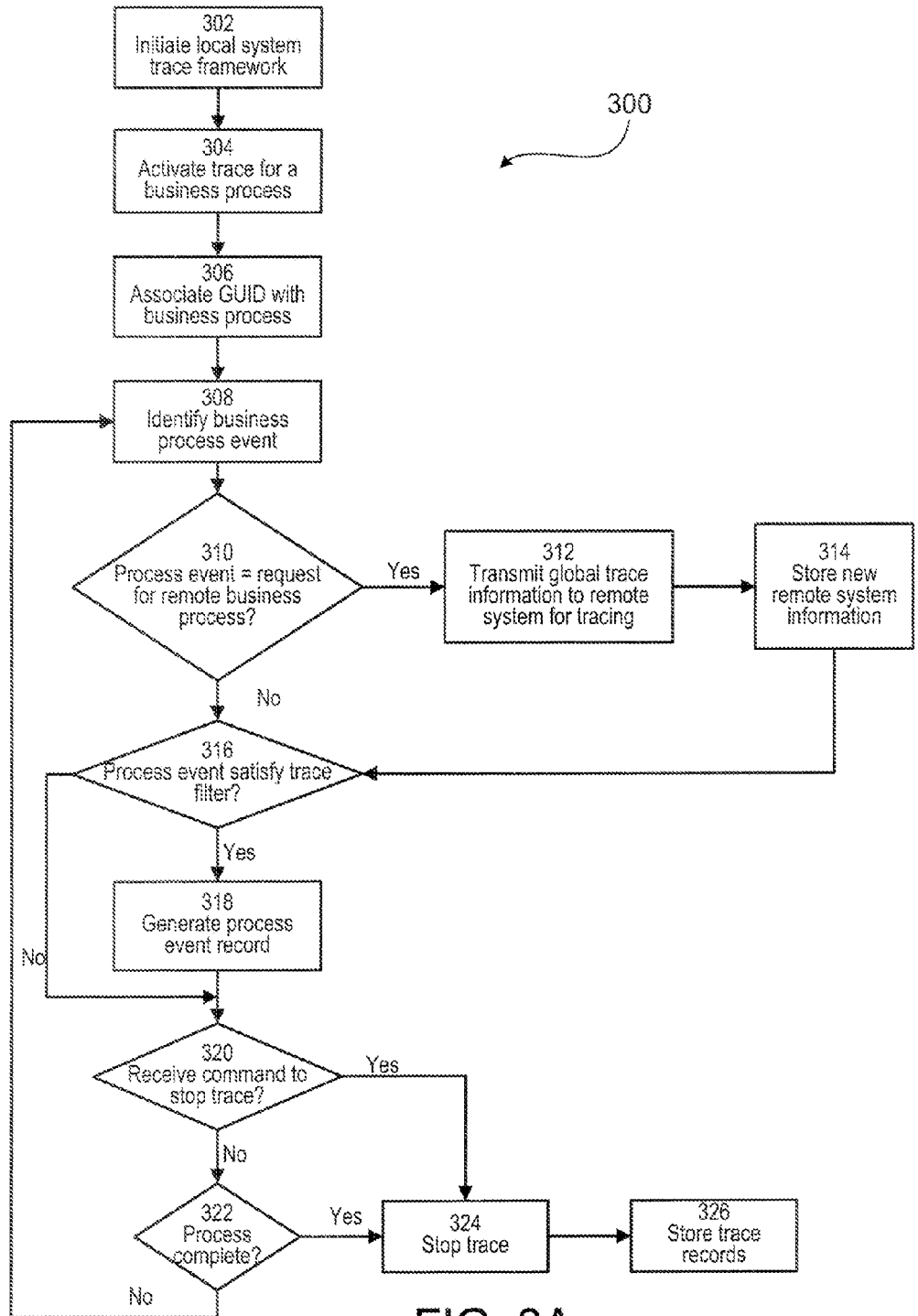
FIG. 3A is a flowchart illustrating one example of the steps for performing a trace analysis of a first business process from the perspective of a first computer system initializing the trace analysis within one of the illustrated environments of FIG. 1.
Figure 3B:
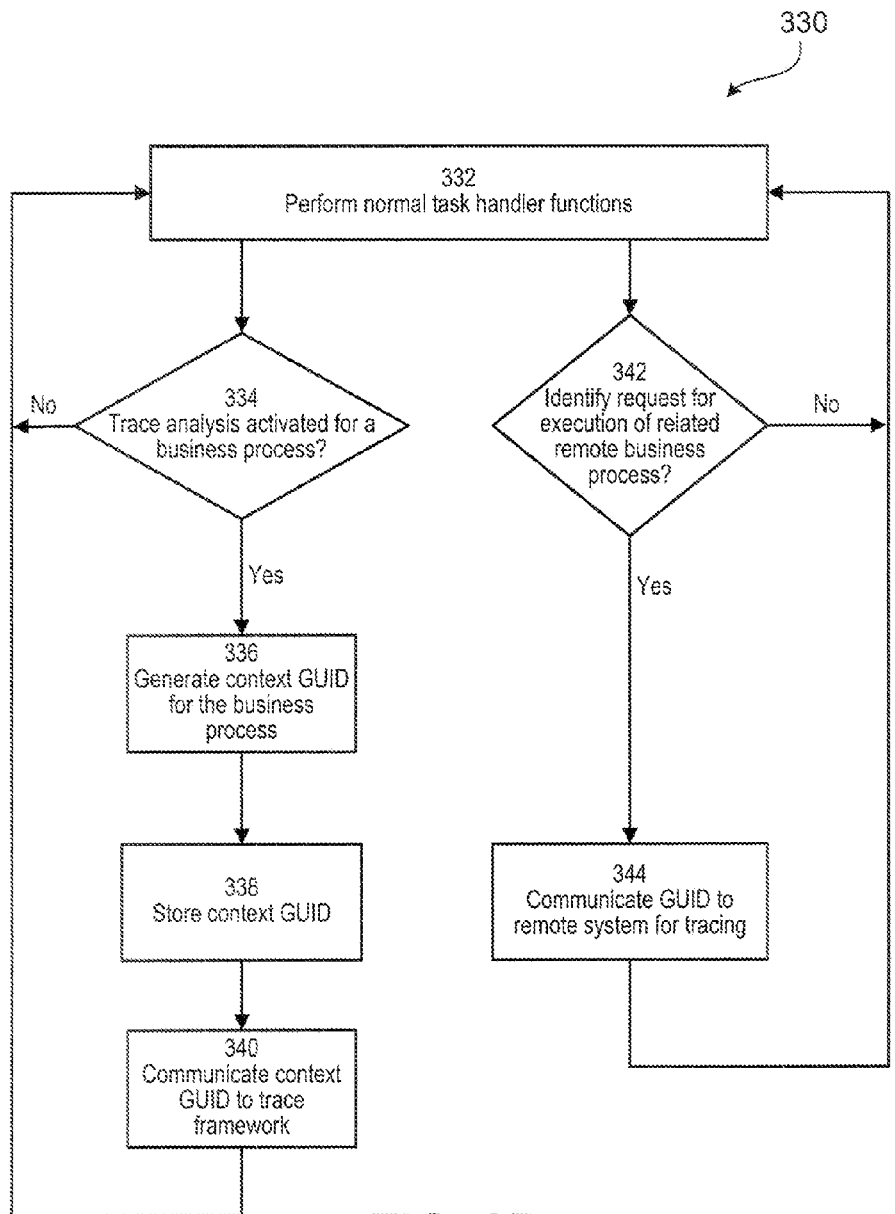
FIG. 3B is a flowchart illustrating an example of the steps for performing a trace analysis of the first business process from the perspective of an example task handler associated with the first computer system within one of the illustrated environments of FIG. 1.
Figure 3C:
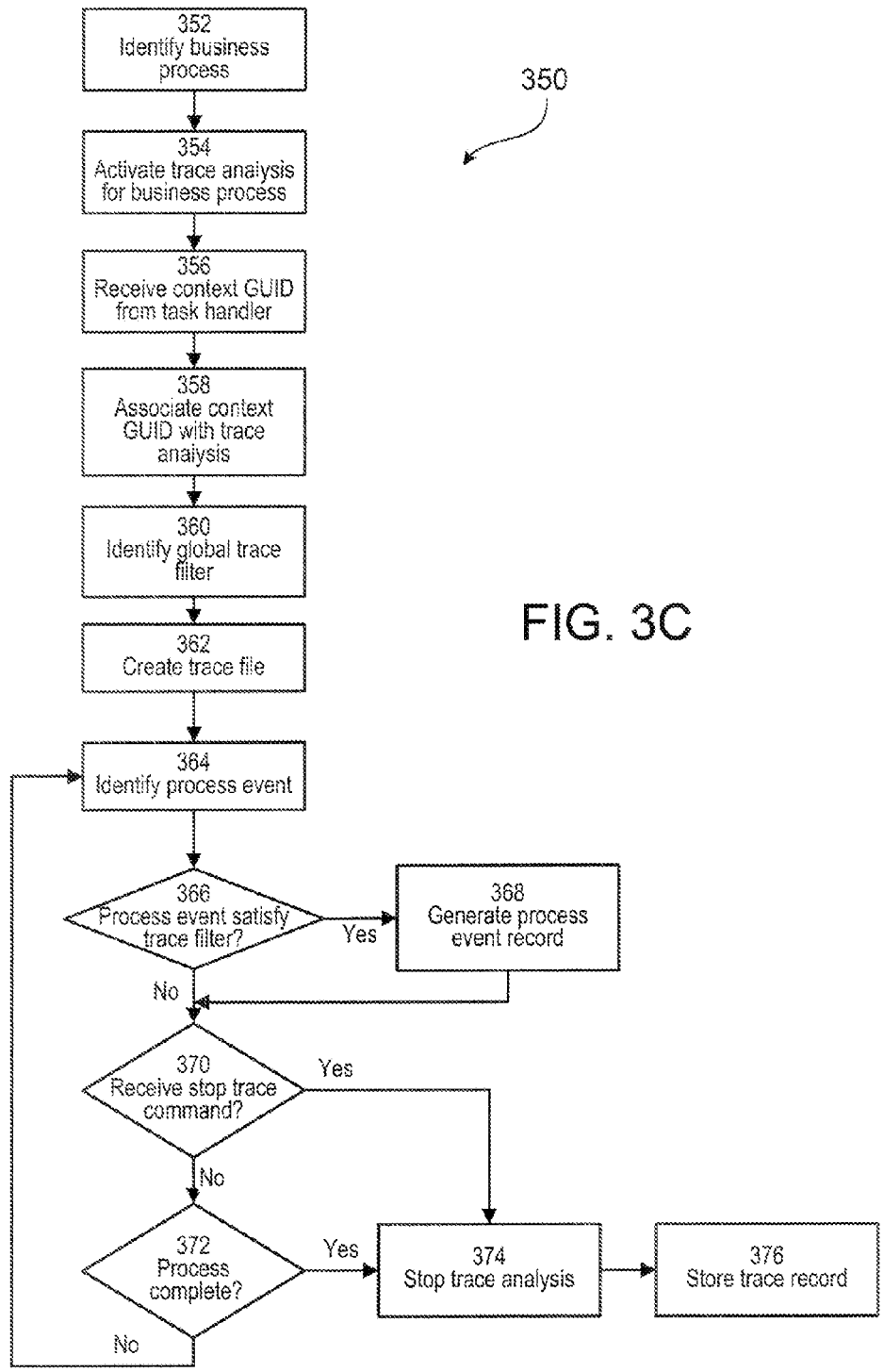
FIG. 3C is a flowchart illustrating an example of the steps for performing a trace analysis of the first business process from the perspective of an example trace framework associated with the first computer system within one of the illustrated environments of FIG. 1.

FIGS. 3A-3C are flowcharts illustrating one implementation of the trace analysis processes performed by the first server 114a, the task handler 135a, and the trace framework 123a associated with the first business process 144a. In particular, FIG. 3A provides a flowchart illustrating an example process 300 for tracing a first business process 144a running on a first portion of a distributed business application 141a from the perspective of server 114a as illustrated in FIG. 1A. At step 302, the trace framework 123a of server 114a is initiated. At step 304, a trace analysis for the first business process 144a is activated. In some alternative implementations, the trace analysis may instead be activated for and associated with the first business application 141a running one or more business processes 144a. In some instances, the trace analysis may be activated by a user using a visual interface associated with the trace framework 123a at GUI 108 of client 102.

Figure 7:
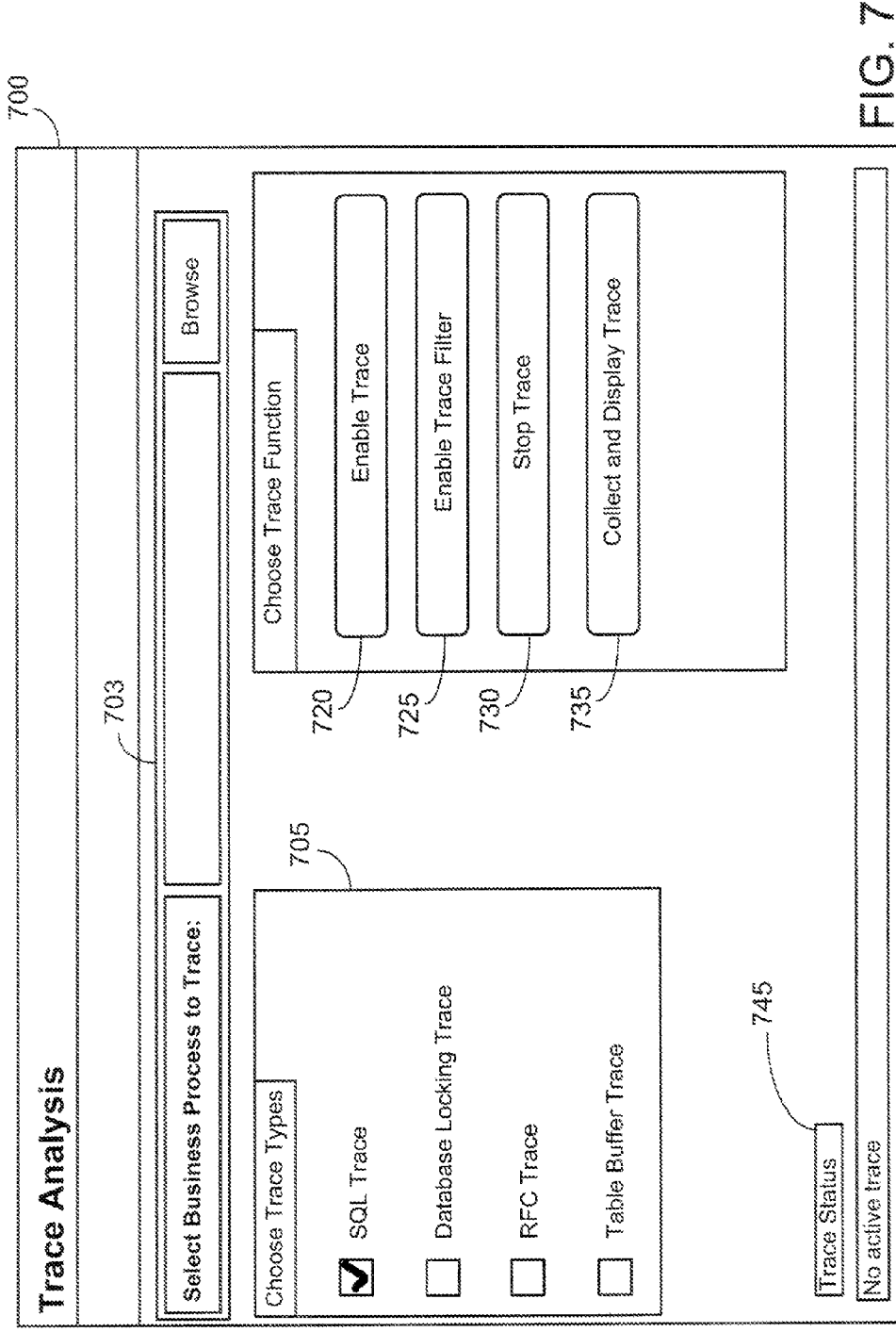
FIG. 7 illustrates one embodiment of the initial screen for the visual interface of the trace framework provided to the client GUI within one of the illustrated environments of FIG. 1.

FIG. 7 provides one embodiment of the initial screen 700 for the visual interface of the trace framework 123a displayed to the user at the GUI 108. The initial screen 700 may be used to activate the trace analysis for a particular business process 144. The initial screen 700 may be the entire GUI 108 presented, or it may be embedded in the GUI 108 amongst additional screens and information. Field 703 provides an input box for the user to insert or select the particular business process 144a to be traced. In some instances, the user may type in the name or path of the desired business process 144. In other instances, the Browse button adjacent to field 703 may be used to show and select the possible business processes 144 available for tracing. In some instances, the trace framework 123a, or a software module associated with the trace framework 123a, may automatically populate the field 703 with a particular business process.

Once the particular business process 144 is chosen, the user may select the type of information to be traced. As illustrated, the Choose Trace Type table 705 provides users with the option to select the types of business process events to be traced. In the present implementation, four trace types are available for selection and include a SQL Trace, a Database Locking Trace, an RFC Trace, and a Table Buffer Trace. Additional trace types relevant to the type of business processes 144 generally executed within the particular environment 100 may be available in other implementations. Using the radio buttons of table 705, the user may select one or more of the trace types. The selections made from the Choose Trace Type table 705 may be associated with the trace filter 126 of FIGS. 1A and 1B so that only business process events matching the types specified are recorded during the trace analysis. In some instances, additional filters may be enabled by activating the Enable Trace Filter button 725. This button 725 may provide the user with more detailed tracing criteria, thus allowing users to further limit the information recorded. Some additional criteria that may be used to limit the trace analysis may include one or more of the following: the actions executed by a specific user, the use of a particular transaction, process, or program, or the accessing of a particular file. The additional filter criteria may allow users to more finely focus the trace analysis on particular operations and tasks of the business process 144.

Once the filters and the business process 144 to be traced are set, the user may enable the trace by activating the Enable Trace button 720. Once enabled, the Trace Status Display 745 may show that a trace is active. As illustrated, the Trace Status Display 745 shows that no trace is active. The initial screen 700 also provides a Stop Trace button 730. When activated, the Stop Trace button 730 can end the current trace analysis, regardless of whether the business processes 144 being traced have completed their operations. Finally, the initial screen 700 may also include the Collect and Display Trace button 735. When activated, the Collect and Display Trace button 735 may send the user to the Collect and Display Trace interface 800 illustrated in FIG. 8. At this screen, the user may collect, display, and analyze the recorded trace records 150.

Returning to FIG. 3A, a context GUID is associated with the business process 144a at step 306 after the trace is activated. In most cases, the context GUID is associated with the business process 144a either simultaneously with or immediately after the trace is activated in step 304 in order to avoid omitting any business process events occurring shortly after the trace analysis is activated. In those alternative implementations where the trace analysis is activated for and associated with the first business application 141a, then at step 306 the context GUID is instead associated with the first business application 141a. At step 308, the trace analysis process 300 identifies an event associated with the business process 144a. In some instances, this event may include the accessing of a particular database, the use of a SQL statement, or some other task associated with the business process 144*a*.

At step 310, the process 300 determines whether the business process event identified is a request for the execution of a remote business process 144*b*. If the identified event is not a request for the execution of the remote business process 144*b*, the process 300 continues to step 316. However, if the identified event is such a request, then at step 312 the server 114*a* transmits the global trace information (e.g., the context GUID and trace filter 126*a* associated with the business process 144*a*) to a remote system or server (e.g., server 114*b*) where the remote business process 144*b* is to be executed. Further, at step 314, the server 114*a* stores the information describing the remote system or server to which the trace information is sent. This remote system information may be stored in either the memory 147*a* or the trace framework 123*a*, and is important for the overall tracing of the related business processes 144 executed remotely from the server 114*a*. Once the information has been stored, process 300 continues to step 316.

At step 316, it is determined whether the business process event identified in step 308 satisfies the trace filter 126*a* associated with the first business process 144*a*. If the identified business process event does not satisfy the trace filter 126*a* criteria, the process 300 continues at step 322. However, if the identified business process event does satisfy the trace filter 126*a* criteria, then a business process event record may be generated and associated with the business process 144*a* at step 318. Examples of the information stored in a business process event record may include the event's name, the start and stop times of the event, the result, and whether the event was successful. Additionally, in some instances the trace filter 126*a* may be set so that requests for the execution of remote business processes 144 are also recorded during the trace analysis.

At step 320, the process 300 determines whether a command to stop the trace analysis has been received. In some instances, the stop command may be automatically generated based on one or more events occurring during the execution of the first business process 144*a*, while in other instances the stop command may be manually generated by the user activating the Stop Trace button 730 of FIG. 7. If a stop command has been received, process 300 may move to step 324 where the trace analysis is stopped. If no stop command is received, however, process 300 continues at step 322, where a determination is made as to whether the first business process 144*a* is complete. If the first business process 144*a* is not complete, then process 300 may return to step 308 at which the next business process event is identified. However, if the business process 144*a* is complete, then the trace analysis is stopped at step 324. Once the trace analysis is stopped, the trace record 150 associated with the business process 144*a* may optionally be stored in memory 147*a* at step 326. In some instances, the trace record 150 may be a runtime file populated with the process event records generated by the trace analysis. In those instances, the runtime files may be stored at the completion of the trace analysis so the trace record 150*a* can be reviewed and analyzed at a later time. In other implementations, the trace record 150*a* may be stored in memory 147*a* at all times and updated with each new business process event. In those instances, step 326 is superfluous and may be omitted.

FIG. 3B provides a flowchart illustrating an example process 330 for the operations of the task handler 135*a* associated with the first portion of the business application 141*a* used during trace analyses on one or more business processes 144*a* executed in the distributed environment 100. At step 332, the task handler 135*a* performs its normal functions, such as monitoring the processes and programs running on server 114*a*. At step 334, the task handler 135*a* determines whether a trace analysis has been activated for a particular business process 144*a*. If no trace has been activated, the process 330 returns to step 332 and its normal operations. If a trace analysis has been activated, then at step 336 the task handler 135*a* generates a context GUID for the particular business process 144*a* being traced. As previously described, the context GUID may be generated using a combination of system-, business process-, and time-specific information. After generation of the context GUID, at step 338 the task handler 135*a* stores the context GUID and the identity of the associated business process 144*a* in the context GUID list 138*a*. Once that information is stored, the task handler 135*a* may communicate the context GUID to the trace framework 123*a* at step 340. Process 330 may then return to the normal functions of the task handler 135*a* at step 332.

At step 342, the task handler 135*a* determines whether it has received a request from the first business process 144*a* to execute the second business process 144*b* on remote server 114*b* has been identified. If no such request is identified, task handler 135*a* may return to its normal functions at step 332. However, if the task handler 135*a* identifies a request for the execution of the second business process 144*b*, then at step 344 the task handler 135*a* may cause the communication of the context GUID associated with the first business process 144*a* (and, in some cases, the trace filter 126*a*) to the remote server 114*b*. In some implementations, the task handler 135*a* may communicate the information to the remote server 114*b* itself. In other instances, the task handler 135*a* may cause another component, application, or process of the first server 114*a* to communicate the information. Once the proper information is provided to the remote server 114*b*, process 330 returns to step 332.

FIG. 3C is a flowchart illustrating an example process 350 for performing a trace analysis of the first business process 144*a* from the perspective of the trace framework 123*a* within the first server 114*a* of FIG. 1A. At step 352, the trace framework 123*a* identifies a first business process 144*a* to be traced. At step 354, the trace analysis for the identified business process 144*a* is activated. Upon activation of the trace analysis, the trace framework 123*a* receives a context GUID associated with the identified business process 144*a* from the task handler 135*a* at step 356. Once the context GUID is received, it may be associated with the first business process 144*a* and its trace analysis at step 358. In some instances, the trace framework 123*a* may store and maintain the context GUIDs for the set of trace analyses run by the framework 123*a*. In other instances, the trace framework 123*a* may rely on the context GUID list 138*a* of the task handler 135*a* to maintain the context GUIDs associated with the various trace analyses.

At step 360, the trace framework 123*a* identifies a global trace filter 126*a*. In some instances, the trace filter 126*a* may be defined by a user interacting with the trace framework 123*a* (e.g., via the visual interface 700 of FIG. 7), while in other instances the trace filter 126*a* may be set to a default value determined by the trace framework 123*a*. In some instances, the default value may be the criteria applied in to the previous trace analysis. In still other instances, the default value may be a predefined set of criteria used as the general trace filter 126*a* when no other values are provided. Once the trace filter 126*a* is set, the trace framework 123*a* creates a trace file to store the information recorded during the trace analysis at step 362. In the implementation of FIG. 3C, the trace file is a runtime file stored within the trace framework 123*a*. In other implementations, the trace file may be created and stored in memory 147*a*. As more business process events occur during the trace analysis, the trace file may be updated either synchronously or asynchronously.

At step 364, the trace framework 123a identifies a business process event occurring during the execution of the first business process 144a. The identified process event may be any operation performed by the identified business process 144, including, as examples, the accessing of a database, an RFC call, or a request to execute a remote business process 144. After identifying the event, at step 366 the trace framework 123a determines whether the business process event satisfies the criteria of the trace filter 126a. For instance, the trace filter 126a may be set to only record events where a database is accessed. Thus, if the identified event is an RFC call, the trace filter 126a criteria will not have been met and the trace analysis process 350 will continue to step 370. However, when the identified event satisfies the trace filter 126a criteria, the trace framework 123a generates a business process event record within the trace file at step 368. The event record includes relevant information regarding the identified event, including, for example, one or more of the following: the user associated with the event, the transaction, process, or program associated with the event, the time elapsed during the event, including the event start and stop times, and any output or result of the event. The information may be stored in the trace file created at step 362.

At step 370, the trace framework 123a determines whether a stop trace command has been received. If the stop trace command is received, then at step 374 the trace analysis is stopped. If a stop trace command is not received, then at step 372 the trace framework 123a determines whether the first business process 144a is complete. If the first business process 144a is not complete, then the trace analysis process 350 may return to step 364 and identify the next process event. However, if the business process 144a is complete, then the trace analysis is stopped at step 374. If the trace file is a runtime file, then at step 376 the trace file may be permanently stored as the trace record 150a. If the trace framework 123a saved information to the trace record 150a during the analysis, the connections to the trace record 150a may be closed and the trace record 150a stored.

Figure 4A:
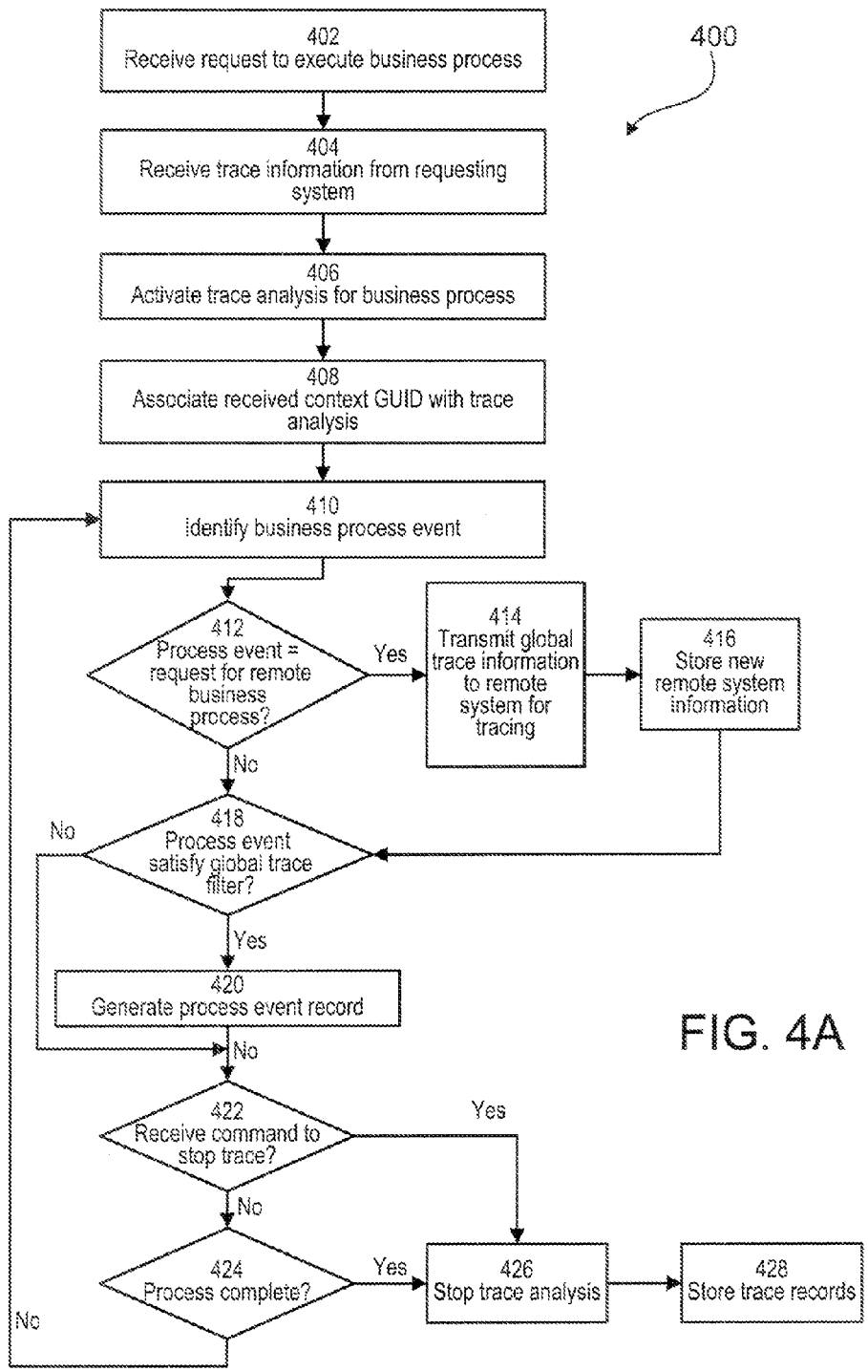
FIG. 4A is a flowchart illustrating one example of the steps for performing a trace analysis of a second business process related to the first business process from the perspective of a remote second computer system within one of the illustrated environments of FIG. 1.
Figure 4B:
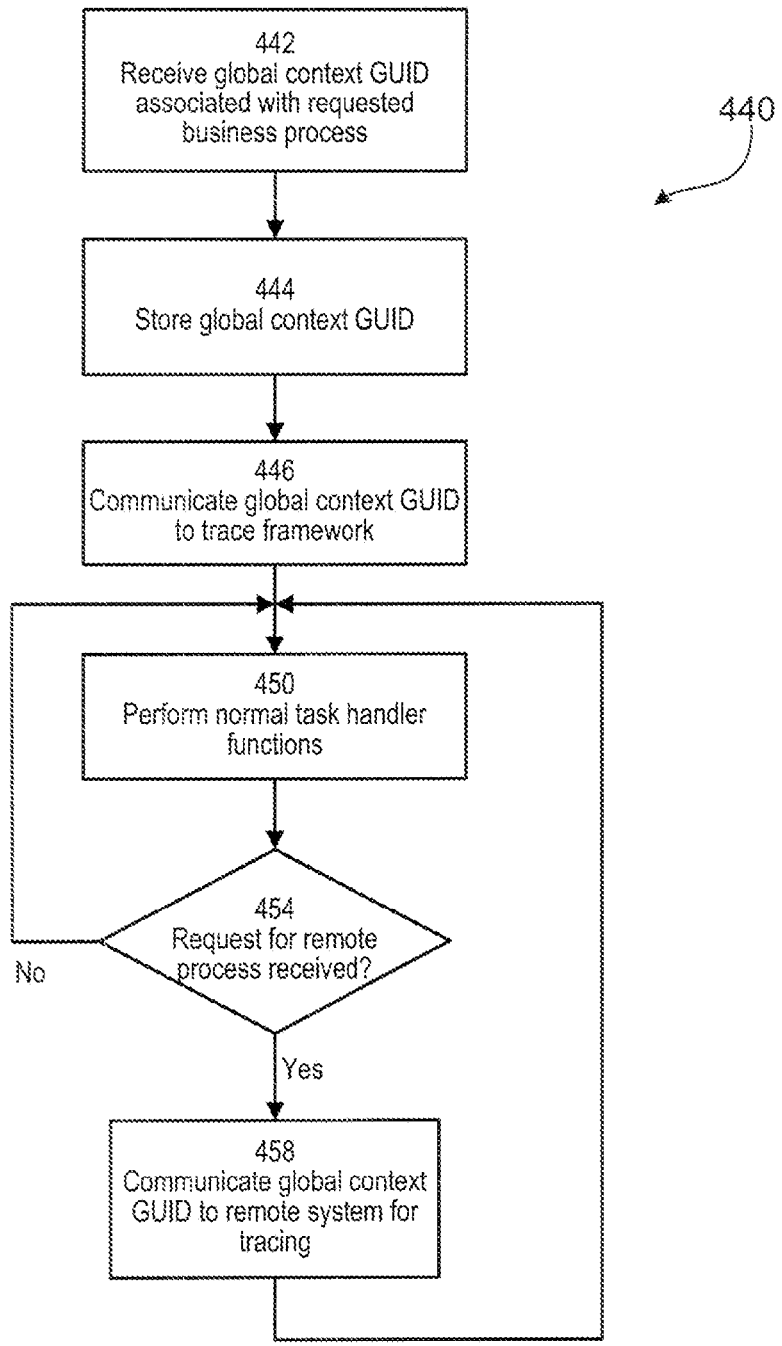
FIG. 4B is a flowchart illustrating one example of the steps for performing a trace analysis of the second business process from the perspective of an example task handler associated with the second computer system within one of the illustrated environments of FIG. 1.
Figure 4C:
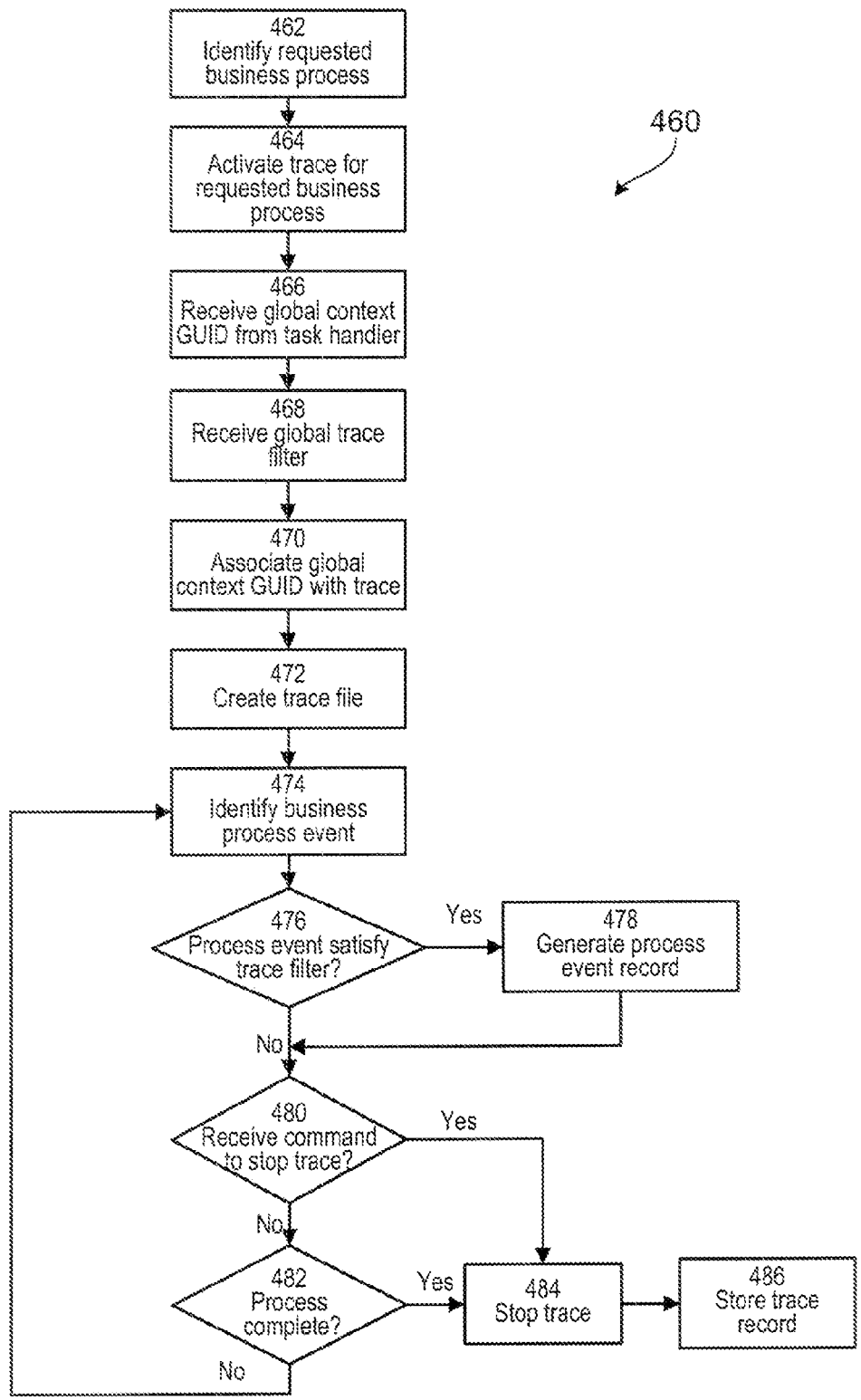
FIG. 4C is a flowchart illustrating an example of the steps for performing a trace analysis of the distributed business process from the perspective of an example trace framework associated with the second computer system within one of the illustrated environments of FIG. 1.

FIGS. 4A-C are flowcharts illustrating one implementation of the processes performed at the remote second server 114b during a trace analysis after receiving a request from the first server 114a to execute a second business process 144b. FIG. 4A illustrates the trace analysis process 400 from the perspective of the second server 114b, FIG. 4B illustrates the trace analysis process 440 from the perspective of the second task handler 135b associated with the second server 114b, and FIG. 4C illustrates the trace analysis process 460 from the perspective of the trace framework 123a.

Turning to FIG. 4A, at step 402 the server 114b receives a request to execute a second business process 144b from server 114a, wherein the requested second business process 144b is related to the first business process 144a of server 114a. At step 404, the server 114b receives a set of trace information from the requesting server 114a, the trace information including the context GUID of the first business process 144a and the global trace filter 126a. In some instances, the server 114b may set trace filter 126b to the criteria of the received global trace filter 126a. In some instances, the request and trace information received in steps 402 and 404, respectively, may be received simultaneously in a single message or other communication. At step 406, a trace analysis on the second business process 144b may be activated. In some instances, the trace analysis may be automatically activated based upon the requests received from the first server 114a. In one example, either the request for the execution of the second business process 144b received at step 402 or the set of trace information received at step 404 may include a command to activate a trace analysis on the second business process 144b. In other instances, the trace analysis may be manually activated by a local user of server 114b. Once the trace is activated, then the trace analysis, and in effect the second business process 144b, may be associated with the context GUID at step 408. The association of the context GUID with the trace analysis of the second business process 144b allows the relevant trace records 150 related to the first business process 144a to be easily identified and, in turn, collected. The methods used to collect the trace analysis results may retrieve all trace records 150 with the context GUID associated with trace analysis of the first business process 144a.

At step 410, an event associated with the second business process 144b is identified. Once identified, at step 412 it is determined whether the business process event is a request for the execution of an additional remote business process 144. In some instances, the additional remote business process 144 may be business process 144c at server 114c as illustrated in FIG. 1B. In other instances, the remote business process 144 requested may be a business process 144 executed at the first server 114a other than the first business process 144a. If the business process event is not a request for an additional remote business process 144, process 400 continues at step 418. However, if the process event is a request for the execution of a new remote business process 144, then at step 414 the trace information, which includes the trace filter 126b and the global context GUID associated with the trace analysis, are transmitted to the remote system where the requested business process 144 will be run. At step 416, information regarding the new system may be stored. Once the information has been stored, process 400 may continue at step 418.

At step 418, a determination as to whether the identified business process event satisfies the trace filter 126b is made. If the identified process event does not satisfy the filter 126b, then process 400 moves to step 422. However, if the identified event does satisfy the filter 126b, at step 420 a business process event record may be generated that describes the event in detail. Once the event record is generated, process 400 continues to step 422 where it is determined whether a stop trace command has been received. If a stop trace command has been received, then process 400 continues to step 426. If a stop trace command has not been received, then process 400 continues at step 424 where it is determined whether the second business process 144b is complete. If the second business process is not complete, then process 400 may return to step 410 and identify a new business process event. However, if the business process 144b is complete, then process 400 continues to step 426 where the trace analysis is stopped. Once the trace is stopped, the business process event records are stored at step 428 as part of the trace record 150b at memory 147b.

FIG. 4B provides a flowchart for example process 440 illustrating the operations of the task handler 135b associated with the second portion of the business application 141b used to enable a trace analysis of the second business process 144b requested by the first business process 144a. At step 442, the task handler 135b receives the context GUID to be associated with the requested second business process 144b. Once the global context GUID is received, at step 444 the task handler 135b stores the context GUID in the context GUID list 138b of the task handler 135b and associates the context GUID with the second business process 144b. At step 446, the task handler 135b communicates the global context GUID and the identity of the associated business process 144b to the trace framework 123b. Once the context GUID is communicated to the trace framework 123b, the task handler 135b performs its normal functions at step 450, including monitoring the processes, tasks, and programs executed at the second server 114b. At step 454, the task handler 135b determines whether the second business process 144b requests that a remote business process (e.g., business process 144c at server 114c) be executed. If the second business process 144b has not requested a remote process, then task handler 135b may return to its normal functions at step 450. However, if the second business process 144b does request the execution of a remote business process 144, then at step 458 the task handler 135b communicates the global context GUID associated with the second business process 144b (and consequently, the first business process 144a) to the remote system associated with the requested business process 144. Once the information is provided to the remote system, the task handler 135b may again return to its normal functions at step 450.

FIG. 4C provides a flowchart for example process 460 illustrating the operations of the trace framework 123b associated with the second server 114b performing a trace analysis on the second business process 144b requested by the first business process 144a. At step 462, the trace framework 123b identifies the requested second business process 144b. Once identified, the trace framework 123b may activate the trace analysis for the second business process 144b at step 464. In the preferred implementation, the trace framework 123b can automatically activate the trace analysis for the second business process 144b once the second business process 144b is identified in step 462. In other implementations, the trace analysis may be manually activated by a user of the trace framework 123b. At step 466, the trace framework 123b receives the global context GUID associated with the first business process 144a from the task handler 135b. Additionally, at step 468 the trace framework 123b receives the global trace filter 126a from the first server 114a. The trace filter 126b associated with the trace analysis of the second business process 144b is then set to the criteria of the global trace filter 126a so that similar information is recorded for all related processes 144 across the distributed environment 100. Once the global context GUID and the trace filter 126a are received, the trace framework 123b associates the received context GUID with the second business process 144b at step 470. The trace framework 123b may then create a trace file at step 472 for storing the business process event records generated during the trace analysis. In some instances, the trace file may be a runtime file stored temporarily in the trace framework 123b during the trace analysis of the second business process 144b, or, in other instances, the trace file may be the trace record 150b stored in memory 147b.

At step 474, the trace framework 123b identifies a business process event. Using the trace filter 126b, at step 476 the trace framework 123b determines whether the business process event satisfies the trace filter's 126b criteria. If the event does not meet the criteria of the trace filter 126b, then process 460 continues at step 480. If the event does meet the criteria of the trace filter 126b, then at step 478 the trace framework 123b generates a business process event record in the trace file. Once the record is generated, process 460 moves to step 480, where the trace framework 123b determines whether a stop trace command has been received. In some instances, the stop trace command may be sent from the server 114a after it receives a stop trace command from the first business process 144a or a user local to the first server 114a, while in other instances, a local user of server 114b may manually generate the stop trace command. If a stop trace command is received, then process 460 continues at step 484. Otherwise, process 460 moves to step 482 where the trace framework 123b determines whether the second business process 144b is complete. If the second business process 144b is not complete, then process 460 returns to step 474 where a new business process event may be identified. However, if the second business process 144b is complete, then the trace analysis is stopped at step 484. Once the trace analysis is stopped, then the trace file is permanently stored in the trace record 150b at step 486.

Figure 5:
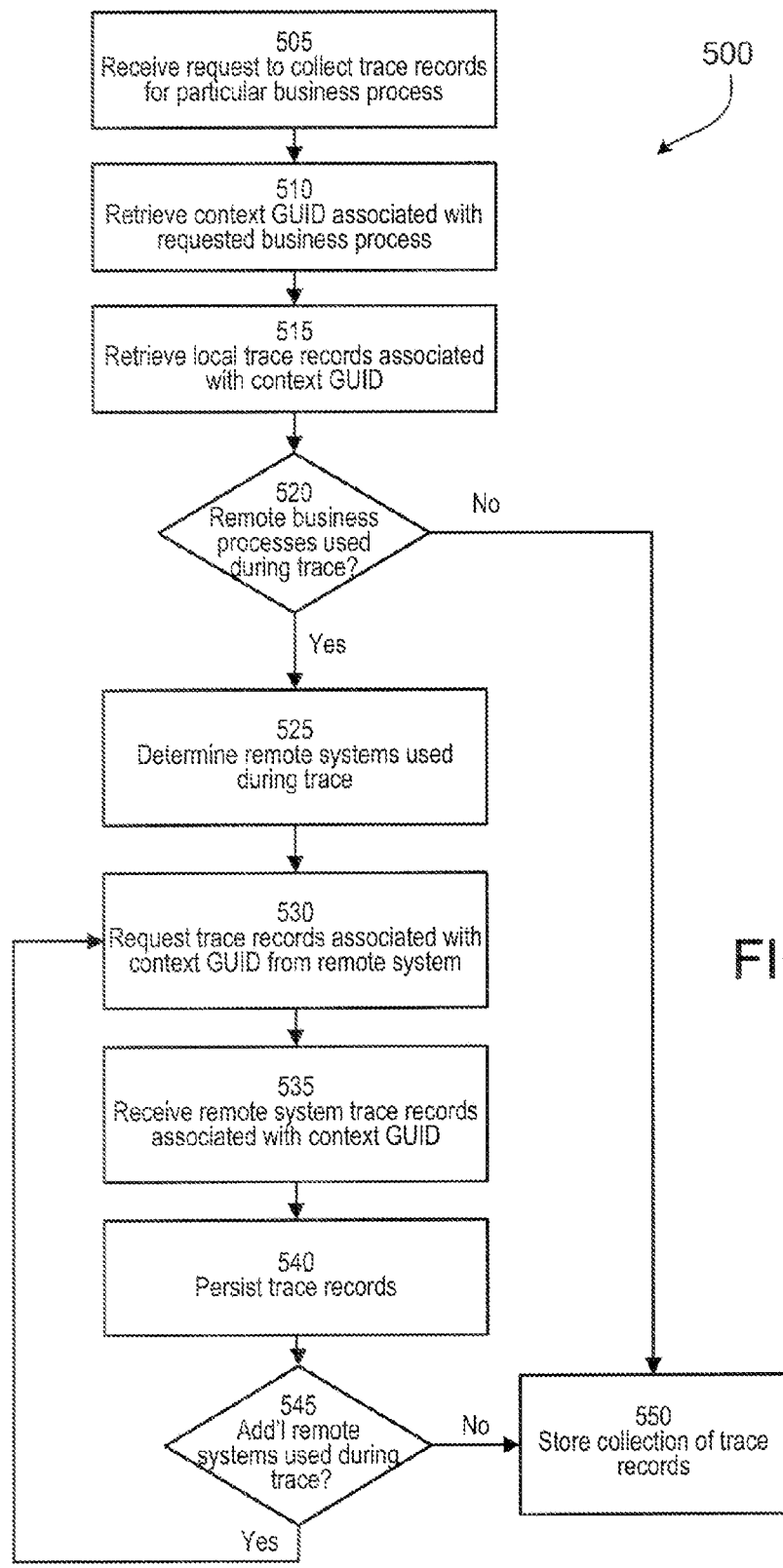
FIG. 5 is a flowchart illustrating one example of the steps for collecting the trace records generated during the trace analyses of the first and second business processes from the perspective of the first computer system within one of the illustrated environments of FIG. 1.
Figure 6:
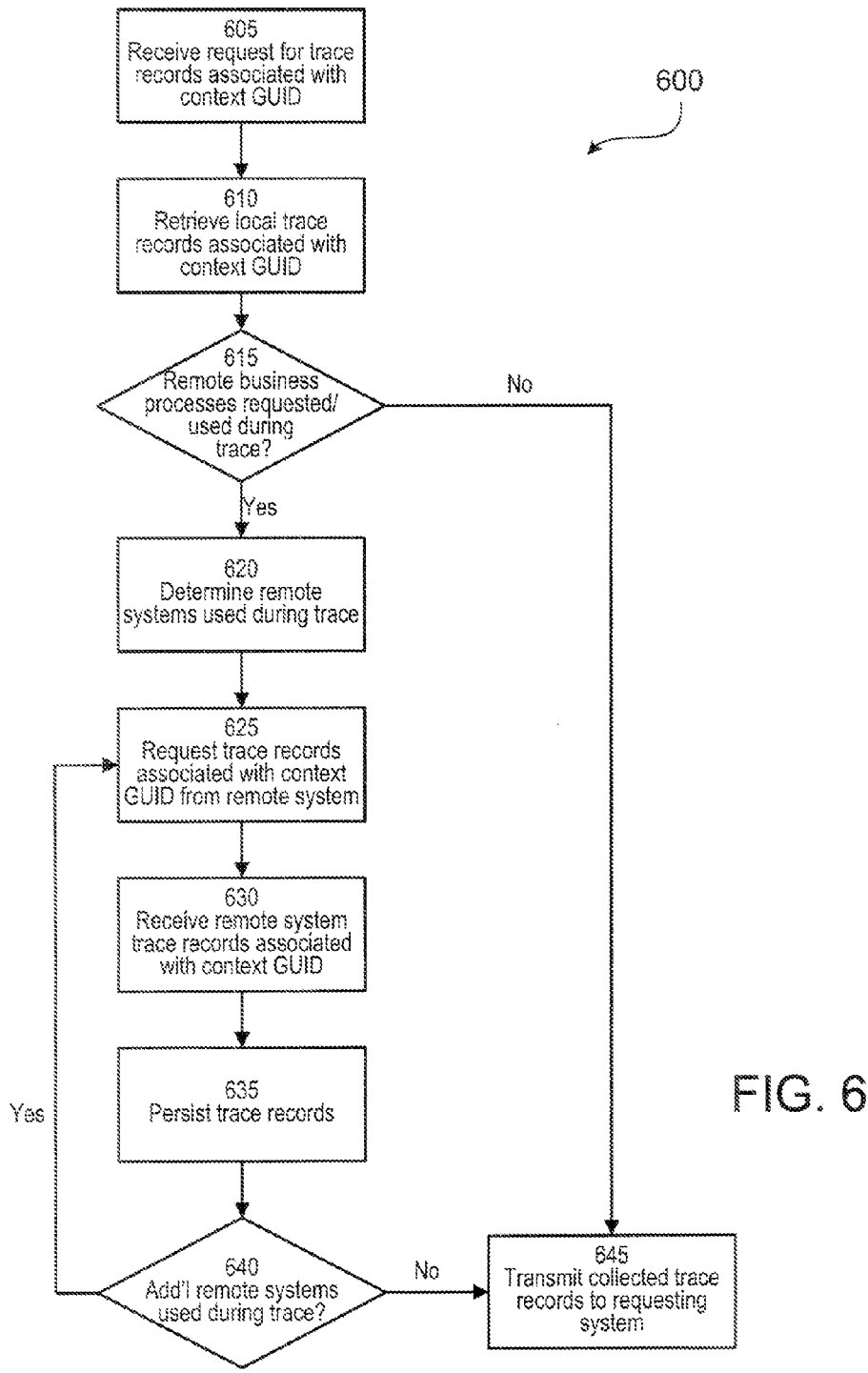
FIG. 6 is a flowchart illustrating one example of the steps for collecting the trace records generated during the trace analyses of the first and second business processes from the perspective of the second computer system within one of the illustrated environments of FIG. 1.

Once the related business processes 144 and the trace analyses are completed, trace records 150 associated with the plurality of related business processes 144 may be located throughout the distributed environment 100. FIGS. 5 and 6 describe the processes used to collect the sets of trace records 150 associated with the trace analysis of the first business process 144a from each location in the distributed environment 100 where such information may be located. FIG. 5 describes the process 500 from the perspective of the trace framework 123a associated with the first business process 144a, while FIG. 6 describes the process 600 from the perspective of the trace framework 123b associated with a related but remotely executed second business process 144b.

Beginning with FIG. 5, the trace framework 123a receives a request to collect trace records 150 associated with a particular business process 144 (in this instance, the first business process 144a) at step 505. In some instances, the request may be generated by a user who manually selected the first business process 144a using the first business process's name, context GUID, description, start time, stop time, or other identifying information recorded during the trace analysis. In other instances, the trace framework 123a, or another software module using the trace framework 123a, may request or perform the collection process. In those cases, the collection processes 500 and 600 may be an extension of the trace analysis processes described in FIG. 3A through 4C.

Figure 8:
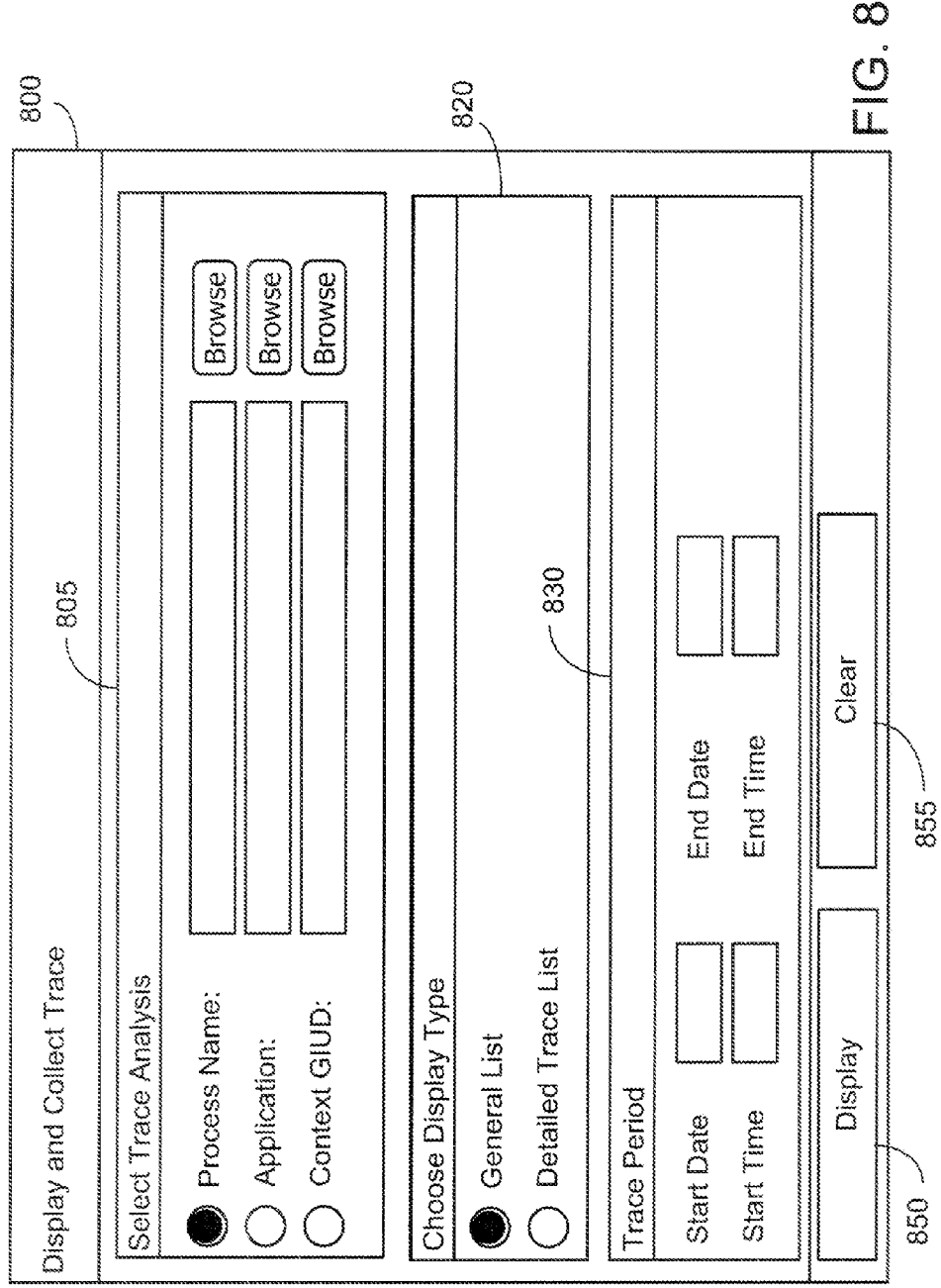
FIG. 8 illustrates one embodiment of the trace analysis collection and display screen for the visual interface of the trace framework provided to the client GUI within one of the illustrated environments of FIG. 1.

FIG. 8 provides an example user interface 800 at the GUI 108 for requesting the collection and display of the trace records 150 associated with the trace analysis of the first business application 144a. The Select Trace Analysis box 805 allows users to select a particular business process 144 whose trace records 150 are to be collected and displayed to the GUI 108. In the implementation of FIG. 8, the user may select the business process 144 according to the process's name, the application associated with the business process 144, or the process's context GUID. In other implementations, other data may be used to select which business process's 144 trace analysis to display. If the user does not know the exact information associated with a particular business process 144, the Browse buttons associated with each selection criteria may be activated to show the user the potential trace analyses to view.

Once a business process 144 has been selected, the user may use the Choose Display Type box 820 to select the type of record display to be shown. As illustrated, the box 820 provides users with the option of selecting a general trace list or a detailed trace list. The general trace list may display information such as the transaction, process identification number, process type, client, and user name. Additionally, information on the duration of the event, the operation name, and the statement description may also be displayed. The detailed trace list provides some additional information to the general trace list, for instance, the time at which the record was executed, the name of the program that executed the recorded statement, and information on any cursor used to access database entries. In other implementations, additional display types may be present. The radio buttons associated with the Choose Display Type box 820 may be changed through user interaction, such as a mouse-click or keyboard input.

Further, the Trace Period box 830 allows users to specify a set of time criteria for limiting the events displayed. Users may specify a starting date and time as well as an ending date and time so that only events occurring between those values are shown when the trace analysis is displayed to the user. Once the user has completed specifying which trace analysis to collect and display, the Display button 850 may be activated. Upon activation, the trace analysis information may be presented to the user at the GUI 108. If the information entered by the user is incorrect, however, the user may activate the Clear button 855 to empty all fields of the user interface 800. In some implementations, the information in the Select Trace Analysis box 805 may be pre-filled with the context GUID, process name, or program associated with the last-executed trace analysis. In that way, users may easily collect the information on a previously-run trace analysis without needing to know the associated context GUID, process name, or application involved.

Returning to FIG. 5, at step 510 the trace framework 123*a* retrieves the context GUID associated with the requested first business process 144*a*. In instances where the context GUID is stored by the task handler 135*a*, the trace framework 123*a* may send a request to the task handler 135*a* for the context GUID associated with the first business process 144*a*. In other instances, the context GUID may be stored locally at the trace framework 123*a* and retrieved from the trace framework's 123*a* internal storage. Once the context GUID has been retrieved, at step 515 the trace framework 123*a* uses the context GUID to retrieve the trace records 150*a* present in the local system (i.e., server 114*a*). To retrieve the local records 150*a*, the trace framework 123*a* may access memory 147*a* using a query for the trace records 150*a* associated with the context GUID. Once the local trace records 150*a* associated with the context GUID are received, the trace framework 123*a* may store or persist the records 150 internally in the set of trace information 129*a*.

At step 520, the trace framework 123*a* determines whether, during the trace analysis for the first business process 144*a*, any remote business processes 144 were requested by the first business process 144*a*. If no remote business processes 144 were requested, then collection process 500 may continue at step 550. However, if one or more remote business processes 144 were requested, then the trace framework 123*a* determines the remote systems involved in the trace analysis at step 525. In some instances, the remote systems involved may be known such that the remote systems may be determined manually by a user. In other instances, the list of remote systems involved may be stored in a test framework or environment. Further, the remote systems involved in the trace analysis may be automatically derived by the trace framework 123*a*. To do so, the trace framework 123*a* may access the set of requested business process information 132*a* associated with the first business process 144*a* that is stored within the trace framework 123*a*. The set of requested process information 132*a* can include information related to the requests for remote business processes 144 made by various business processes 144 as they were traced. In some instances, the information in the set of requested process information 132*a* may include the identity of the first business process 144*a*, the remote business processes 144 requested, the communication protocols used to request the remote business process 144, and the remote systems with which the first business process 144*a* communicated. Each record in the set of requested business process information 132*a* may be associated with the context GUID of the business process 144 for which the request was generated. Thus, the trace framework 123*a* may query the set of requested process information 132*a* using the context GUID associated with the trace analysis of the first business process 144*a* to determine which remote systems should be contacted to retrieve additional, related trace records 150.

At step 530, the trace framework 123*a* requests trace records 150 associated with the first business process's 144*a* context GUID from a first remote system determined in step 525. In the present implementation, the first remote system is the second server 114*b*. Further description of the collection process from the perspective of the second server 114*b* is provided below in relation to FIG. 6. At step 535, the trace framework 123*a* receives the trace records 150*b* associated with the first business process's 144*a* context GUID from the second server 114*b*. At step 540, the trace records 150*b* received from the second server 114*b* may be persisted with the local trace records 150*a* in the set of trace information 129*a*. In some instances, the received trace records 150*b* may be stored in memory 147*a* instead of the set of trace information 129*a*. At step 545, the trace framework 123*a* determines whether additional remote business processes 144 at other remote systems (e.g., server 114*c* of FIG. 1B) were requested by the first business process 144*a*. If no additional business processes 144 were requested, the process 500 may continue at step 550. If additional systems were used, then process 500 returns to step 530 and the trace framework 123*a* may perform steps 530 through 540 for the additional system. Once the collection is complete and no additional remote systems are left for retrieval, then at step 550 the trace framework 123*a* may store the complete set of trace information 129*a* in memory 147*a*. In other instances, the collected trace records 150*a* may be kept within the set of trace information 129*a* of the trace framework 123*a*. In some instances, the collected set of trace records 150 may be maintained for a certain period of time such that the collection process 500 does not need to be run again during that period. By maintaining the collected trace records 150, users may review the results of the trace analysis without running multiple collection processes each time the information is requested.

FIG. 6 illustrates the collection process 600 from the perspective of the trace framework 123*b* on the remote server 114*b* where the second business process 144*b* was executed. At step 605, the trace framework 123*b* receives a request from the first server 114*a* for all trace records 150 associated with a specific context GUID associated with the first business process 144*a*. The request received at step 605 may be the request sent by the trace framework 123*a* at step 530 of FIG. 5. Similar to step 515 of FIG. 5, the trace framework 123*b* first retrieves the local trace records 150*b* associated with the context GUID at step 610. Once the local trace records 150*b* have been retrieved, at step 615 the trace framework 123*b* determines whether the second business process 144*b* requested the execution of any remote business processes 144 during its own execution. If the second business process 144*b* did not request additional remote processes 144, then process 600 continues at step 645. However, if the second business process 144*b* did request the execution of additional remote business processes 144, then process 600 continues to step 620. Using the processes described at step 525 of FIG. 5, the trace framework 123*b* determines the remote systems involved in the execution of the second business process 144*b* at step 620. For example, the trace framework's 123*b* set of requested process information 132*b* may include information related to the remote business processes 144 requested by the second business process 144*b*, the remote systems associated with the requested business processes 144, and the communication protocols and settings used to communicate with the remote system.

At step 625, the trace framework 123b sends a request to one of the determined remote systems, such as server 114c of FIG. 1B, for the trace records 150c associated with the context GUID of the second business process 144b (and, by association, of the first business process 144a). At step 630, the trace framework 123b receives the set of requested trace records 150c from the remote system. The trace framework 123b persists the received trace records 150c at step 635. In some instances, persisting the received trace records 150c may mean that the received trace records 150c are stored in the set of trace information 129b with the collected local trace records 150b. In other instances, the received trace records 150c may be stored in memory 147b with other trace records 150b associated with the second server 114b. At step 640, the trace framework 123b determines whether any additional remote systems, through requests for the execution of remote business processes 144, were involved in the trace analysis. If additional remote systems were involved, then process 600 returns to step 625 to request the records from those additional remote systems. If the trace framework 123b has completed the collection and no additional remote systems remain, then at step 645 the local trace records 150b and the records 150 collected from the one or more remote systems are transmitted to the system from which the collection request of step 605 was sent. In this particular instance, the collected trace records 150 may be supplied to server 114a. For example, step 535 of FIG. 5 describes the trace framework 123a of the first server 114a receiving the collected trace records 150 transmitted from the trace framework 123b of the second server 114b.

While the present disclosure uses a plurality of flowcharts and accompanying descriptions to illustrate the example techniques associated with various processes of FIGS. 3A through 6, environment 100 contemplates using or implementing any suitable technique for performing these and other tasks. It will be understood that these techniques are for illustration purposes only and that the described or similar techniques may be performed at any appropriate time, including concurrently, individually, or in combination. In addition, many of the steps in these flowcharts may take place simultaneously and/or in different orders than as shown and described. Moreover, environment 100 may use processes with additional steps, fewer steps, and/or different steps, so long as the processes remain appropriate.

Although this disclosure has been described in terms of certain implementations and generally associated methods, alterations and permutations of these implementations and methods will be apparent to those skilled in the art. For instance, the first business process 144a may request for the execution of not only additional remote business processes 144, but also business processes 144 local to server 114a. Additionally, the distributed environment 100 may include more systems than shown in either FIGS. 1A and 1B, such that process 600 is performed by a plurality of trace frameworks 123 associated with each of the plurality of systems. In still other instances, the context GUID may not be directly associated with an individual business process 144. Instead, the context GUID may be associated with a business application 141. In those instances, a new context of the trace framework 123 may be created and set to the inheriting mode. Next, a particular business application 141 may be started in the this newly created context in order to be traced. Once the particular business application 141 is started, the trace framework 123 may begin to trace the particular business application 141. The trace framework 123 may then receive a context GUID associated with the business application 141 from the task hander 135. Next, the trace framework 123 may associate the received context GUID with the trace framework 123 header data included in each generated trace record 150. From there, the processes described in FIGS. 3A-4C may occur during the execution of the particular business application 141 such that a set of trace records 150 related to the execution of the particular business application 141 are generated, including those trace records 150 generated by the execution of other business applications 141 related to the particular business application 141. This alternative provides the ability to trace every part or portion of a business application 141 without the need to predefine which of the one or more business processes 144 related to the business application 141 to trace. Using this solution, each business process 144 executed by and related to the particular business application 141 may be traced. When starting the trace of the particular business application 141, the initial screen 700 of FIG. 7 may provide a field 703 that would allow users to provide a short description of the trace or trace measurements for later identification and review (instead of the currently illustrated use of field 703, namely, selecting the business process 144 that is to be trace). Additionally, in the Collect and Display Trace interface 800 of FIG. 8, it may be possible to present a list of trace descriptions or trace measurements (e.g., trace header data containing the context GUID for identification of a single trace record) from where users could select from and display the various trace analyses. Accordingly, the above description of example implementations does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. A computer-accessible, non-transitory, storage medium encoded with computer-readable instructions configured to cause one or more data processing apparatus to:
   generate a globally unique identifier (GUID) of a first business process that is associated with a trace;
   identify a trace filter associated with the first business process, the trace filter defining a set of business process event information to be recorded during a trace associated with the first business process;
   store the GUID in a listing that associates the GUID with the first business process, the listing further including a plurality of additional GUIDs associated with a plurality of additional business processes;
   retrieve the GUID from the listing and the identified trace filter associated with the first business process and transmit the GUID and the identified trace filter to a remote computer to associate the GUID and the identified trace filter with a second business process, where the second business process uses the identified trace filter to determine the set of business process event information to record during the trace;
   receive a request to collect trace records associated with the trace of the first business process based on the associated GUID, the request generated automatically in response to completion of the first business process;
   collect a first local set of trace records associated with a trace analysis and associated GUID of the first business process in response to the received request;
   transmit, to a remote computer system associated with the second business process, a request for trace records associated with the GUID and the one or more trace analyses and of the one or more related business processes; and receive, from the remote computer system associated with the second business process, a second set of trace records associated with the GUID and generated by the trace analysis of the second business processes, the second set of trace records comprising one or more events traced during the execution of the second business process.

2. The medium of claim 1, wherein the GUID comprises the combination of a system identifier, a business process identifier, and a time identifier.

3. The medium of claim 1 further operable to supply the GUID to a local trace framework for association with a set of trace records generated during the trace associated with the first business process, the set of trace records recorded based on the identified trace filter.

4. The medium of claim 1, wherein transmitting the GUID and the identified trace filter to the remote computer for association with the second business process comprises transmitting the GUID and the identified trace filter via an exposed application programming interface (API) in response to a request for the GUID from the remote computer.

5. The medium of claim 1 further operable when executed to monitor the status of one or more locally executed applications.

6. The medium of claim 1 further operable to:
generate a second GUID associated with a third business process that is associated with a second trace; and
transmit the second GUID and the identified trace filter to a second remote computer for association with a fourth business process related to the third business process.

7. The medium of claim 1 further operable to:
receive a second GUID and a second trace filter associated with the trace of a third business process from a second remote computer, the second GUID and the second trace filter received for association with a local fourth business process; and
associate the second GUID and the second trace filter with the local fourth business process related to the third business process.

8. A system comprising:
memory storing a tracing program; and
one or more processors operable to:
request activation of a first trace analysis using the tracing program associated with a first business process;
associate a first globally unique identifier (GUID) with the first business process;
associate a first trace filter with the first trace analysis, the first trace filter defining a set of business process event information to be recorded during the first trace analysis;
generate, with the first trace analysis, a first local set of trace records associated with one or more events traced during the execution of the first business process, the first local set of trace records generated based on the first trace filter;
store the first GUID in a listing that associates the first GUID with the first business process, the listing further including a plurality of additional GUIDs associated with a plurality of additional business processes;
identify one or more requests from the first business process to execute one or more related business processes, each of the one or more related business processes associated with one of a plurality of remote computer systems;
retrieve the first GUID from the listing and the first trace filter and transmit the first GUID and the first trace filter to the particular one of the plurality of remote computer systems associated with each of the one or more related business processes to associate the first GUID and the first trace filter with the one or more related business processes, where each of the one or more related business processes use the first trace filter to determine the set of business process event information to record during the trace analysis executed at each of the one or more related business processes;
receive a request to collect trace records associated with the first GUID and the trace analysis of the first business process, the request generated automatically in response to completion of the first trace analysis;
collect the first local set of trace records associated with the first GUID and the first trace analysis of the first business process;
transmit, to each particular one of the plurality of remote computer systems associated with one or more of the related business processes, a request for trace records associated with the first GUID and the one or more trace analyses of the one or more related business processes; and
receive from each particular one of the plurality of remote computer systems associated with one or more of the related business processes a set of trace records associated with the first GUID and generated by the trace analyses of the related business processes, each set of trace records comprising one or more events traced during the execution of the related business process.

9. The system of claim 8, wherein each of the one or more requests from the first business process to execute a related business process comprises:
a request to activate a trace analysis of the related business process at the particular one of the plurality of remote computer systems associated with the related business process;
the first GUID associated with the first business process, wherein the first GUID is to be associated with the trace analysis of the related business process; and
the first trace filter, wherein the first trace filter is to be used for the trace analysis of the related business process.

10. The system of claim 8, wherein each event in the first local set of trace records satisfies the first trace filter.

11. The system of claim 8, the one or more processors further operable to:
activate a second trace analysis associated with a second business process;
associate a second GUID with the second business process;
associate a second trace filter with the second trace analysis, the second trace filter defining a set of business process event information to be recorded during the second trace analysis;
generate, with the second trace analysis, a second local set of trace records associated with one or more events traced during the execution of the second business process, the second local set of trace records generated based on the second trace filter;
identify one or more requests from the second business process to execute one or more related business processes, each of the one or more related business process associated with a particular one of the plurality of remote computer systems; and
transmit the one or more requests for execution of the one or more related business processes to the particular one of the plurality of remote computer systems associated with each of the one or more related business processes.

12. The system of claim 8, wherein the first trace filter criteria specifies that one or more of the following events are to be recorded during the first trace analysis:
   a SQL statement;
   a database lock;
   a logical lock;
   a request for the execution of a related business process at a remote computer system;
   a remote function call;
   a Hypertext Transfer Protocol (HTTP) communication;
   an authorization check;
   a programming language modularization unit; or
   a table buffer access.

13. The system of claim 8, wherein each event in the set of trace records received from each of the plurality of remote computer systems satisfies the first trace filter.

14. A system for tracing distributed business processes comprising:
   memory storing a tracing program and a business application; and
   one or more processors operable to:
      activate a trace analysis on a first business process related to a second business process executing on a remote computer system, the business process associated with the business application;
      associate a globally unique identifier (GUID) with the first business process;
      associate a first trace filter with the trace analysis, the first trace filter defining a set of business process event information to be recorded during the trace analysis;
      store the GUID in a listing that associates the GUID with the first business process, the listing further including a plurality of additional GUIDs associated with a plurality of additional business processes;
      retrieve the GUID from the listing and the first trace filter associated with the first business process and transmit the GUID and the first trace filter to the remote computer system to associate the GUID and the first trace filter with the second business process; and
      generate, with the trace analysis, a local set of trace records associated with one or more events traced during the execution of the first business process, where the local set of trace records comprises the one or more events traced during the execution of the first business process satisfying the first trace filter;
      receive a request to collect trace records associated with the GUID and the trace analysis of the first business process, the request generated automatically in response to completion of the trace analysis;
      collect the first local set of trace records associated with the GUID and the trace analysis of the first business process;
      transmit, to each particular one of the plurality of remote computer systems associated with one or more of the related business processes, a request for trace records associated with GUID and the one or more trace analyses of the one or more related business processes; and
      receive, from each particular one of the plurality of remote computer systems associated with one or more of the related business processes, a set of trace records associated with the GUID and generated by the trace analyses of the related business processes, each set of trace records comprising one or more events traced during the execution of the related business process.

15. The system of claim 14, the one or more processors operable to activate the trace analysis on the first business process in response to a message from the remote computer system, wherein the message comprises:
   a request to activate the trace analysis on the first business process;
   the GUID associated with the second business process; and
   identification of the first trace filter to be associated with the first trace analysis.

16. The system of claim 14, wherein the remote computer system is a first remote computer system, the one or more processors operable to transmit to a second remote computer system a request for the execution of a third business process related to the first business process, the third business process to be executed on the second remote computer system, subject to a trace analysis, and associated with the GUID and the first trace filter associated with the second business process.

17. The system of claim 16, the one or more processors further operable to:
   receive a request to transmit a trace record associated with the first business process to the first remote computer system;
   collect the local set of trace records associated with the execution of the first business process, the local set of trace records collected based on the first trace filter;
   transmit a request to the second remote computer system for a set of trace records associated with the third business process, the set of trace records associated with one or more events traced during the execution of the third business process;
   receive the set of trace records associated with the third business process from the second remote computer system; and
   transmit the local set of trace records and the set of trace records received from the second remote computer system to the first remote computer system.

18. The system of claim 17, wherein each event in the local set of trace records satisfies the first trace filter.

19. The system of claim 17, where each event in the set of trace records received from the second remote computer system satisfies the first trace filter.

20. The system of claim 14, wherein the set of trace filter criteria specifies that one or more of the following events are to be recorded during the trace analysis:
   a SQL statement;
   a database lock;
   a logical lock;
   a request for the execution of a related business process;
   a remote function call;
   a Hypertext Transfer Protocol (HTTP) communication;
   an authorization check;
   a programming language modularization unit; or
   a table buffer access.

21. A computer-accessible, non-transitory, storage medium encoded with computer-readable instructions configured to cause one or more data processing apparatus to:
   identify a globally unique identifier (GUID) of a trace that is executing for a first business process that is associated with a first application;
   identify a trace filter associated with the first business process, the trace filter defining a set of business process event information to be recorded during the trace associated with the first business process;
   store the GUID in a listing that associates the GUID with the first business process, the listing further including a plurality of additional GUIDs associated with a plurality of additional business processes;

retrieve the GUID from the listing and the identified trace filter associated with the first business process and transmit the GUID and the identified trace filter to a remote computer system to associate the GUID and the identified trace filter with the second business process; and associate the GUID and the identified trace filter with a second trace for a second business process related to the first business process, where the second business process is associated with a second heterogeneous application disparate from the first application, where the second business process uses the identified trace filter to determine the set of business process event information to record during the second trace;

receive a request to collect trace records associated with the GUID and the trace analysis of the first business process, the request generated automatically in response to completion of the trace analysis;

collect a first local set of trace records associated with the GUID and the trace analysis of the first business process in response to the received request;

transmit, to the remote computer system associated with the second business process, a request for trace records associated with the GUID and the one or more trace analyses of the one or more related business processes; and receive, from the remote computer system associated with the second business process, a second set of trace records associated with the GUID and generated by the trace analysis of the second business processes, the second set of trace records comprising one or more events traced during the execution of the second business process.

* * * * *